(12) United States Patent
Matsubara et al.

(10) Patent No.: US 9,951,830 B2
(45) Date of Patent: Apr. 24, 2018

(54) VEHICLE, CONTROL APPARATUS FOR VEHICLE, AND CONTROL METHOD FOR VEHICLE

(71) Applicant: TOYOTA JIDOSHA KABUSHIKI KAISHA, Toyota-shi, Aichi-ken (JP)

(72) Inventors: Keigo Matsubara, Nagoya (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/457,108

(22) Filed: Mar. 13, 2017

(65) Prior Publication Data
US 2017/0276195 A1 Sep. 28, 2017

(30) Foreign Application Priority Data
Mar. 22, 2016 (JP) .................................. 2016-057696

(51) Int. Cl.
F16D 48/06 (2006.01)

(52) U.S. Cl.
CPC .... *F16D 48/066* (2013.01); *F16D 2500/1045* (2013.01); *F16D 2500/10412* (2013.01); *F16D 2500/1107* (2013.01); *F16D 2500/5014* (2013.01)

(58) Field of Classification Search
None
See application file for complete search history.

(56) References Cited

U.S. PATENT DOCUMENTS

| 2010/0145584 A1 | 6/2010 | Kojima |
| 2010/0204892 A1* | 8/2010 | Kobayashi ............... F16H 61/20 701/51 |
| 2012/0247095 A1* | 10/2012 | Jinno ..................... F16H 61/143 60/459 |
| 2013/0260957 A1* | 10/2013 | Ueda ......................... B60K 6/52 477/5 |
| 2015/0369362 A1* | 12/2015 | Ando .................... F16H 61/686 701/66 |
| 2017/0276242 A1 | 9/2017 | Matsubara et al. |

FOREIGN PATENT DOCUMENTS

| JP | 2009-014189 A | 1/2009 |
| JP | 2017-172693 A | 9/2017 |

* cited by examiner

*Primary Examiner* — Justin Holmes
(74) *Attorney, Agent, or Firm* — Oliff PLC

(57) ABSTRACT

An electronic control unit performs lockup clutch engagement control in the sequence of fast fill control, constant-pressure standby control and command pressure raising control, and starts the lockup clutch engagement control from that one of the fast fill control and the command pressure raising control which is later in sequence than the other, as a command pressure for a control oil pressure at a transition time point for making a transition to the lockup clutch engagement control rises, in making the transition to the lockup clutch engagement control during the lockup clutch release control. Therefore, when the command pressure for the control oil pressure is equal to or higher than a predetermined value that is needed to carry out packing for narrowing a pack clearance of a lockup clutch, the lockup clutch engagement control is started from the command pressure raising control.

16 Claims, 8 Drawing Sheets

FIG. 4

| | ENGAGEMENT OPERATION CHART | | | | | |
|---|---|---|---|---|---|---|
| | C1 | C2 | C3 | C4 | B1 | B2 |
| 1st | O | | | | | O |
| 2nd | O | | | | O | |
| 3rd | O | | O | | | |
| 4th | O | | | O | | |
| 5th | O | O | | | | |
| 6th | | O | | O | | |
| 7th | | O | O | | | |
| 8th | | O | | | O | |
| Rev | | | O | | | O |

VEHICLE, CONTROL APPARATUS FOR VEHICLE, AND CONTROL METHOD FOR VEHICLE

INCORPORATION BY REFERENCE

The disclosure of Japanese Patent Application No. 2016-057696 filed on Mar. 22, 2016 including the specification, drawings and abstract is incorporated herein by reference in its entirety.

BACKGROUND

1. Technical Field

The disclosure relates to a vehicle, a control apparatus for the vehicle, and a control method for the vehicle in which lockup clutch release control for lowering a command pressure for a control oil pressure to release a lockup clutch and lockup clutch engagement control for raising the command pressure for the control oil pressure to engage the lockup clutch are performed. Also, the disclosure relates to an art of improving the running performance of a vehicle in making a transition to lockup clutch engagement control during lockup clutch release control in the vehicle, a control apparatus for the vehicle, and a control method for the vehicle.

2. Description of Related Art

There is known a control apparatus for a vehicular power transmission device. The vehicular power transmission device is equipped with a transmission, a fluid coupling that is provided between the transmission and a power source, and a lockup clutch that directly couples an input member and an output member of the fluid coupling to each other through the supply of a control oil pressure into a control oil chamber. In this vehicular power transmission device, the control apparatus performs lockup clutch release control for lowering a command pressure for the control oil pressure to release the lockup clutch. For instance, a control apparatus for a vehicular power transmission device described in Japanese Patent Application Publication No. 2009-14189 (JP 2009-14189 A) is such an example. The control apparatus for the vehicular power transmission device of Japanese Patent Application Publication No. 2009-14189 (JP 2009-14189 A) corrects a command pressure in starting lockup clutch release control to be performed subsequently, based on a difference between an actual time from the issuance of a command to perform lockup clutch release control to the actual start of release of a lockup clutch and a target time from the issuance of the command to perform lockup clutch release control to the actual start of release of the lockup clutch, in lockup clutch release control.

SUMMARY

By the way, in Japanese Patent Application Publication No. 2009-14189 (JP 2009-14189 A), it is not described how lockup clutch engagement control is performed in an appropriate manner without causing an engagement shock in making a transition to lockup clutch engagement control during lockup clutch release control, namely, during a transient period in which the lockup clutch is released. For example, it is conceivable to start lockup clutch engagement control from packing for narrowing the pack clearance of the lockup clutch after waiting for the end of lockup clutch release control, namely, after waiting for the release of the lockup clutch. In this control apparatus for the vehicular power transmission device, an engagement shock is restrained from occurring, but it takes a relatively long time until the lockup clutch is engaged after the start of lockup clutch engagement control. Therefore, there can arise a problem of a deterioration in running performance of a vehicle.

The disclosure provides a vehicle, a control apparatus for the vehicle, and a control method for the vehicle that improve the running performance of the vehicle without causing an engagement shock in making a transition to lockup clutch engagement control during lockup clutch release control.

A first aspect of the disclosure is a vehicle. The vehicle includes a transmission, a fluid coupling, a lockup clutch, and an electronic control unit. The fluid coupling is provided between the transmission and a power source. The lockup clutch is configured to directly couple an input member and an output member of the fluid coupling by supply of a control oil pressure to a control oil chamber in the fluid coupling. The electronic control unit is configured to perform lockup clutch release control for lowering a command pressure for the control oil pressure to release the lockup clutch. Besides, the electronic control unit is configured to perform lockup clutch engagement control for raising the command pressure for the control oil pressure to engage the lockup clutch. Furthermore, the electronic control unit is configured such that the lockup clutch engagement control is performed in sequence of fast fill control, constant-pressure standby control and command pressure raising control. Moreover, the electronic control unit is configured to start the lockup clutch engagement control from one of the fast fill control and the command pressure raising control which is later in sequence than the other, as a first command pressure rises, in making the transition to the lockup clutch engagement control during the lockup clutch release control. The first command pressure is the command pressure for the control oil pressure at a transition time point for making a transition to the lockup clutch engagement control.

According to the foregoing configuration, the electronic control unit performs the lockup clutch engagement control in the sequence of fast fill control, constant-pressure standby control and command pressure raising control. Furthermore, the electronic control unit starts the lockup clutch engagement control from one of the fast fill control and the command pressure raising control which is later in sequence than the other, as the first command pressure rises, in making the transition to the lockup clutch engagement control during the lockup clutch release control. Therefore, when the command pressure for the control oil pressure at the transition time point for making the transition to the lockup clutch engagement control is relatively high in making the transition to the lockup clutch engagement control during the lockup clutch release control, the lockup clutch engagement control can be started from the command pressure raising control. The running performance of the vehicle is improved without causing an engagement shock, in comparison with, for example, a case where the lockup clutch engagement control is started from fast fill control for uniformly narrowing the pack clearance of the lockup clutch.

In the vehicle, the fast fill control may be control for raising the command pressure for the control oil pressure to the first predetermined value set in advance and supplying the control oil pressure to the control oil chamber. Besides, the constant-pressure standby control may be control for making the command pressure for the control oil pressure equal to the second predetermined value set in advance and causing the command pressure for the control oil pressure to stand by for the predetermined time. The second predetermined value is lower than the first predetermined value. Moreover, the command pressure raising control may be control for raising the command pressure of the control oil pressure in accordance with the torque capacity that is needed to engage the lockup clutch.

In the vehicle, the electronic control unit may be configured to start the lockup clutch engagement control from the command pressure raising control when the first command pressure is equal to or higher than a third predetermined value that is needed to carry out packing for narrowing a pack clearance of the lockup clutch.

According to the foregoing configuration, when the first command pressure is equal to or higher than the third predetermined value that is needed to carry out packing for narrowing the pack clearance of the lockup clutch, the electronic control unit starts the lockup clutch engagement control from the command pressure raising control. Therefore, a shock is favorably restrained from occurring in engaging the lockup clutch, in the lockup clutch engagement control to which the transition has been made during the lockup clutch release control.

In the vehicle, the lockup clutch may include a friction plate, a piston and a return spring. The piston may be configured to press the friction plate through supply of the control oil pressure to the control oil chamber. The return spring may be configured to urge the piston in such a direction as to move away from the friction plate. The electronic control unit may be configured to start the lockup clutch engagement control from the fast fill control when the first command pressure is equal to or lower than a value of a pressing force of the piston. The pressing force of the piston is generated by the command pressure. The value of the pressing force of the piston is equal to a value of an urging force of the return spring.

According to the foregoing configuration, the lockup clutch includes the friction plate, the piston that presses the friction plate through the supply of the control oil pressure to the control oil pressure, and the return spring that urges the piston in such a direction as to move away from the friction plate. Moreover, when the command pressure for the control oil pressure at the transition time point for making the transition to the lockup clutch engagement control is equal to or lower than the value of the pressing force of the piston that is generated through the command pressure is equal to the urging force of the return spring, the electronic control unit starts the lockup clutch engagement control from the fast fill control. Therefore, when the command pressure for the control oil pressure at the transition time point for making the transition to the lockup clutch engagement control is equal to or lower than the value of the pressing force of the piston that is generated through the command pressure is relatively low and equal to the urging force of the return spring in the lockup clutch engagement control to which the transition has been made during the lockup clutch release control, the lockup clutch engagement control is started from the fast fill control, and packing for narrowing the pack clearance of the lockup clutch is carried out. Therefore, a shock is favorably restrained from occurring in engaging the lockup clutch.

In the vehicle, the electronic control unit may be configured to perform the lockup clutch release control until the command pressure for the control oil pressure once becomes equal to zero and then to start the fast fill control, in performing the lockup clutch engagement control from the fast fill control.

According to the foregoing configuration, in performing the lockup clutch engagement control from the fast fill control, the electronic control unit performs the lockup clutch release control until the command pressure for the control oil pressure once becomes equal to zero, and then starts the fast fill control. Therefore, the control oil pressure in the control oil chamber is favorably drained when the fast fill control is started. Therefore, the actual oil pressure in the control oil chamber is restrained from becoming higher than a target value when the fast fill control is performed.

In the vehicle, the electronic control unit may be configured to start the lockup clutch engagement control from the constant-pressure standby control when the first command pressure is higher than the value of the pressing force of the piston and lower than a value corresponding to the third predetermined value.

According to the foregoing configuration, the electronic control unit starts the lockup clutch engagement control from the constant-pressure standby control when the first command pressure is higher than the value of the pressing force of the piston and lower than a value corresponding to the third predetermined value. Therefore, in the lockup clutch engagement control to which the transition has been made during the lockup clutch release control, when the first command pressure is higher than the value of the pressing force of the piston and lower than a value corresponding to the third predetermined value, the lockup clutch engagement control is started from the constant-pressure standby control, and packing for narrowing the pack clearance of the lockup clutch is carried out. Therefore, a shock is favorably restrained from occurring in engaging the lockup clutch.

A second aspect of the disclosure is a control apparatus for a vehicle. The vehicle includes a transmission, a fluid coupling, a lockup clutch, and an electronic control unit. The fluid coupling is provided between the transmission and a power source. The lockup clutch is configured to directly couple an input member and an output member of the fluid coupling by supply of a control oil pressure to a control oil chamber in the fluid coupling. The electronic control unit is configured to perform lockup clutch release control for lowering a command pressure for the control oil pressure to release the lockup clutch. Besides, the electronic control unit is configured to perform lockup clutch engagement control for raising the command pressure for the control oil pressure to engage the lockup clutch. Furthermore, the electronic control unit is configured to perform the lockup clutch engagement control in sequence of fast fill control, constant-pressure standby control and command pressure raising control. Moreover, the electronic control unit is configured to start the lockup clutch engagement control from one of the fast fill control and the command pressure raising control which is later in sequence than the other, as a first command pressure rises, in making the transition to the lockup clutch engagement control during the lockup clutch release control. The first command pressure is the command pressure for the control oil pressure at a transition time point for making a transition to the lockup clutch engagement control.

According to the foregoing configuration, the electronic control unit performs the lockup clutch engagement control in the sequence of fast fill control, constant-pressure standby control and command pressure raising control. Furthermore, the electronic control unit starts the lockup clutch engagement control from one of the fast fill control and the command pressure raising control which is later in sequence than the other, as the first command pressure rises, in making the transition to the lockup clutch engagement control during the lockup clutch release control. Therefore, when the command pressure for the control oil pressure at the transition time point for making the transition to the lockup clutch engagement control is relatively high in making the transition to the lockup clutch engagement control during the lockup clutch release control, the lockup clutch engagement control can be started from the command pressure raising control. For example, the running performance of the vehicle is improved without causing an engagement shock, in comparison with, for example, a case where the lockup clutch engagement control is started from fast fill control for uniformly narrowing the pack clearance of the lockup clutch.

A third aspect of the disclosure is a control method for a vehicle. The vehicle includes a transmission, a fluid coupling and a lockup clutch. The fluid coupling is provided between the transmission and a power source. The lockup clutch is configured to directly couple an input member and an output member of the fluid coupling to each other through supply of a control oil pressure to a control oil chamber in the fluid coupling. The control method includes; performing lockup clutch release control for lowering a command pressure for the control oil pressure to release the lockup clutch: performing lockup clutch engagement control for raising the command pressure for the control oil pressure to engage the lockup clutch, the lockup clutch engagement control is performed in sequence of fast fill control, constant-pressure standby control and command pressure raising control: and starting the lockup clutch engagement control from that one of the fast fill control and the command pressure raising control which is later in sequence than the other, as a first command pressure rises, in making the transition to the lockup clutch engagement control during the lockup clutch release control. The first command pressure is the command pressure for the control oil pressure at a transition time point for making a transition to the lockup clutch engagement control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an engagement operation chart illustrating a relationship between a shift operation of the automatic transmission of FIG. 2 and a combination of operations of hydraulic frictional engagement devices that are employed for the shift operation;

DETAILED DESCRIPTION OF EMBODIMENTS

The embodiments of the disclosure will be described hereinafter in detail with reference to the drawings. Incidentally, in the following embodiments of the disclosure, the drawings are simplified or modified as appropriate, and the dimensional ratios, shapes and the like of respective portions are not necessarily depicted with precision.

Figure 1:
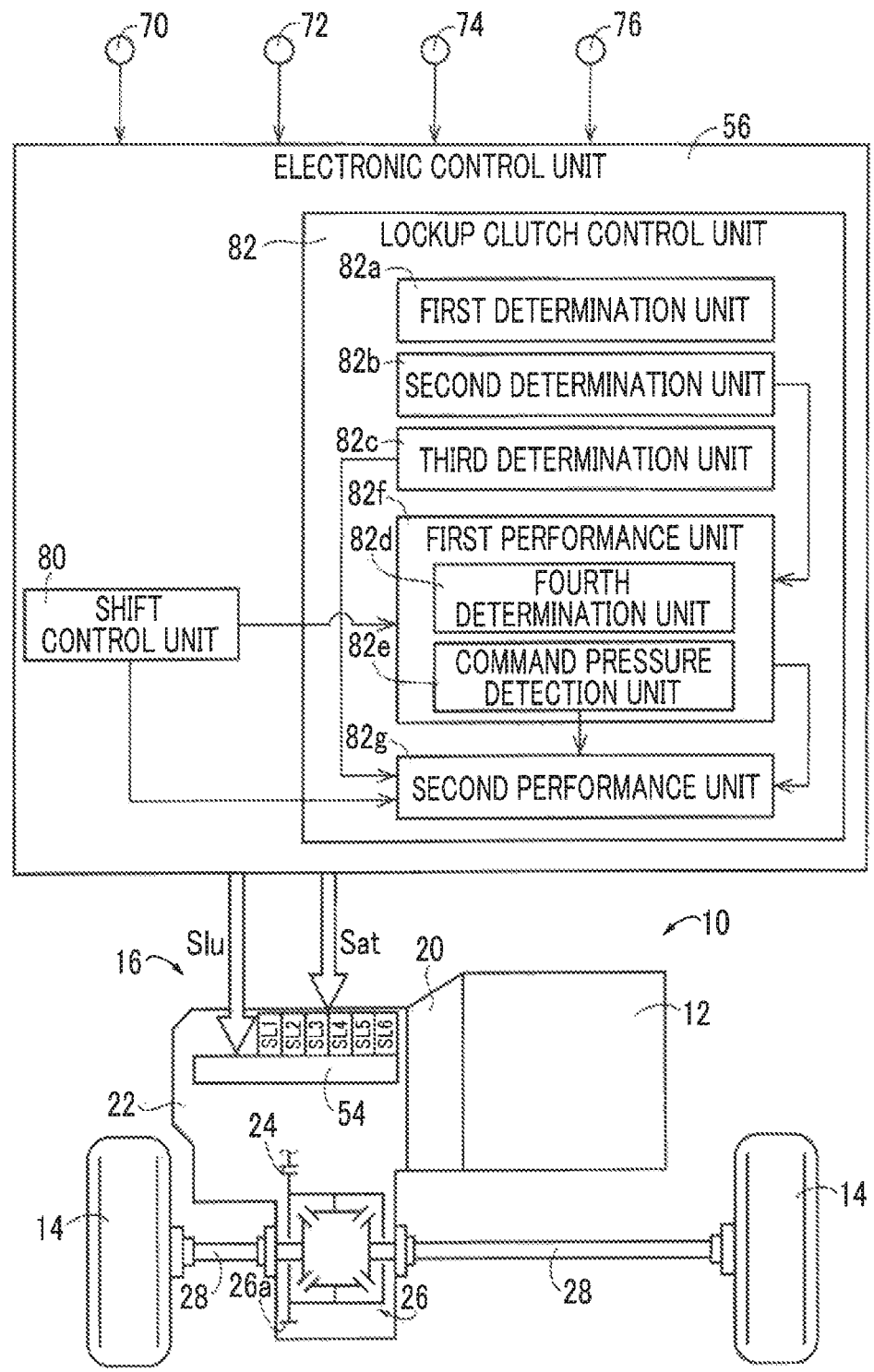
FIG. 1 is a view illustrating the overall configuration of a vehicle to which the disclosure is applied, and is a view illustrating control functions for various kinds of control in the vehicle.

FIG. 1 is a view illustrating the overall configuration of a vehicle 10 to which the disclosure is applied, and is a view illustrating an essential part of a control system for various kinds of control in the vehicle 10. In FIG. 1, the vehicle 10 is equipped with an engine (a power source) 12, driving wheels 14, and a vehicular power transmission device 16 (hereinafter referred to as the power transmission device 16) that is provided in a power transmission path between the engine 12 and the driving wheels 14. The power transmission device 16 is equipped with a torque converter (a fluid coupling) 20, an automatic transmission (a transmission) 22, a differential gear device 26, a pair of axles 28 that are coupled to the differential gear device 26, and the like. The torque converter 20 and the automatic transmission 22 are disposed in a case 18 (see FIG. 2) as a non-rotary member that is attached to a vehicle body. The differential gear device 26 has a ring gear 26a to which a transmission output gear 24 as an output rotary member of the automatic transmission 22 is coupled. In the power transmission device 16, a power that is output from the engine 12 is transmitted to the driving wheels 14 sequentially via the torque converter 20, the automatic transmission 22, the differential gear device 26, the axles 28 and the like. Besides, the torque converter 20 is provided in a power transmission path between the automatic transmission 22 and the engine 12.

The engine 12 is a power source of the vehicle 10, and is configured as, for example, an internal combustion engine such as a gasoline engine, a diesel engine or the like.

Figure 2:
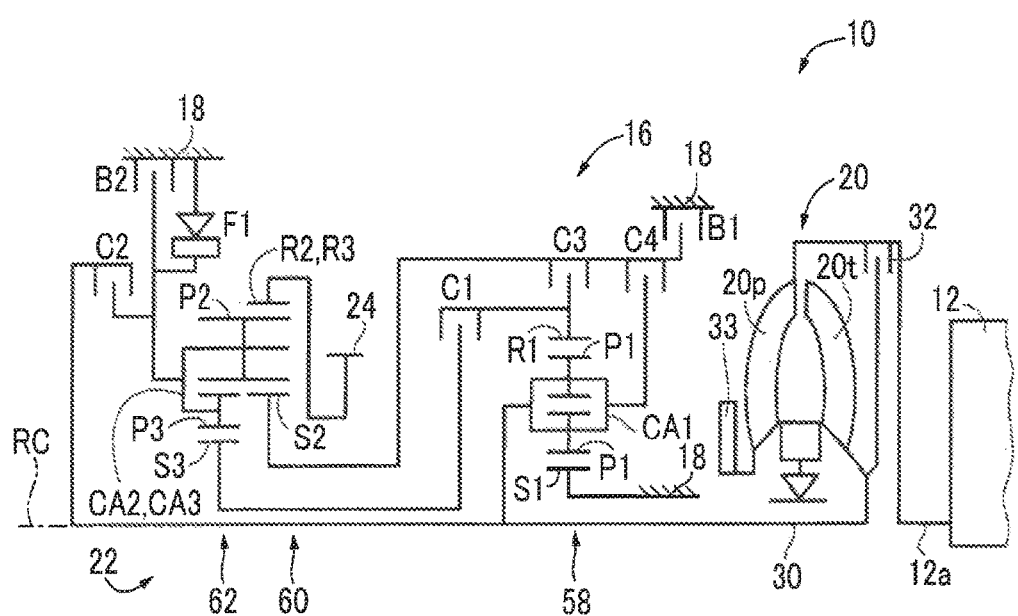
FIG. 2 is a skeleton diagram illustrating an exemplary torque converter and an exemplary automatic transmission that are provided in the vehicle of FIG. 1.

FIG. 2 is a skeleton diagram illustrating an example of the torque converter 20 and an example of the automatic transmission 22. Incidentally, the torque converter 20 and the automatic transmission 22 are configured substantially symmetrically with respect to an axial center RC of a transmission input shaft 30 as an input rotary member of the automatic transmission 22. A lower part below the axial center RC is omitted in FIG. 2.

Figure 3:
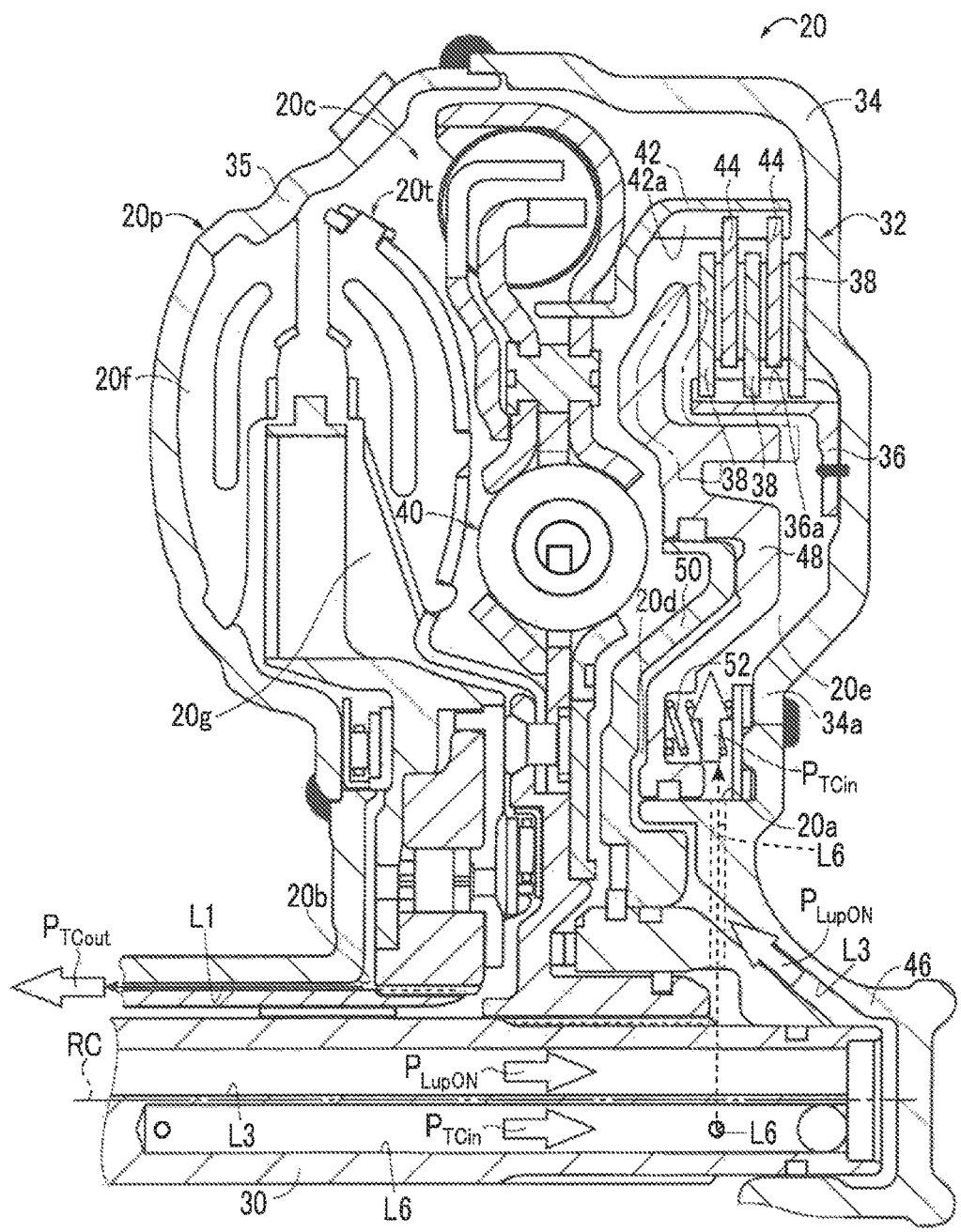
FIG. 3 is a cross-sectional view of the torque converter of FIG. 2.

As shown in FIGS. 2 and 3, the torque converter 20 has a front cover 34 and a rear cover 35 that are welded to each other, and a plurality of pump blades 20f that are fixed to an inner side of the rear cover 35. Furthermore, the torque converter 20 is equipped with a pump impeller (an input member) 20p and a turbine impeller (an output member) 20t. The pump impeller 20p is coupled to a crankshaft 12a of the engine 12 in such a manner as to enable power transmission, and is disposed in such a manner as to rotate around the axial center RC. The turbine impeller 20t is opposed to the rear cover 35, and is coupled to the transmission input shaft 30 in such a manner as to enable power transmission. The torque converter 20 is equipped with a lockup clutch 32 that directly couples the pump impeller 20p and the turbine impeller 20t to each other through the supply of a lockup engagement pressure (a control oil pressure) $P_{SLU}$ into a control oil chamber 20d that will be described later. As described hitherto, the torque converter 20 functions as a vehicular fluid-type transmission device equipped with the lockup clutch 32, which is provided in a power transmission path between the engine 12 and the automatic transmission 22. Besides, the power transmission device 16 is equipped with a mechanical oil pump 33 that is coupled to the pump impeller 20p in such a manner as to enable power transmission. By being rotationally driven by the engine 12, the oil pump 33 generates (discharges) an oil pressure for performing shift control of the automatic transmission 22, engaging the lockup clutch 32 and supplying lubricating oil to respective portions of a power transmission path of the power transmission device 16.

The lockup clutch 32 is a hydraulic multi-plate friction clutch. As shown in FIG. 3, the lockup clutch 32 is equipped with a first annular member 36, a plurality of (three in the present embodiment of the disclosure) first annular friction plates (friction plates) 38, a second annular member 42, a plurality of (two in the present embodiment of the disclosure) second annular friction plates (friction plates) 44, an annular pressing member (a piston) 48, an annular fixed member 50 and a return spring 52. The first annular member 36 is fixed through welding to the front cover 34, which is integrally coupled to the pump impeller 20p. The plurality of the first annular friction plates 38 are engaged with outer peripheral spline teeth 36a that are formed on an outer periphery of the first annular member 36, relatively unrotatably around the axial center RC and movably in a direction of the axial center RC. The second annular member 42 is coupled to the transmission input shaft 30 and the turbine impeller 20t in such a manner as to enable power transmission, via a damper device 40 that is provided in the torque converter 20. The plurality of the second annular friction plates 44 are engaged with inner peripheral spline teeth 42a that are formed on an inner periphery of the second annular member 42, relatively unrotatably around the axial center RC and movably in the direction of the axial center RC, and are disposed among the plurality of the first friction plates 38 respectively. The annular pressing member 48 is supported by a hub member 46 movably in the direction of the axial center RC, and is opposed to the front cover 34. The hub member 46 is fixed to an inner peripheral portion 34a of the front cover 34, and an end portion of the transmission input shaft 30 on the front cover 34 side is supported rotatably around the axial center RC. The annular fixed member 50 is supported by the hub member 46 at a fixed position, and is disposed in such a manner as to be opposed to the pressing member 48 on the other side of the front cover 34. The return spring 52 urges the pressing member 48 toward the fixed member 50 in the direction of the axial center RC. That is, the return spring 52 urges the pressing member 48 in such a direction as to move away from the first friction plates 38 and the second friction plates 44 in the direction of the axial center RC.

Furthermore, as shown in FIG. 3, the torque converter 20 is provided with a main oil chamber (a torque converter oil chamber) 20c in the front cover 34 and the rear cover 35. The main oil chamber 20c has a hydraulic oil supply port 20a to which hydraulic oil output from the oil pump 33 is supplied, and a hydraulic oil outflow port 20b from which hydraulic oil supplied from the hydraulic oil supply port 20a is caused to flow out. Besides, the lockup clutch 32, the control oil chamber 20d, a front-side oil chamber 20e, and a rear-side oil chamber 20g are provided in the main oil chamber 20c of the torque converter 20. The lockup engagement pressure $P_{SLU}$ for engaging the lockup clutch 32 is supplied to the control oil chamber 20d. That is, the lockup engagement pressure $P_{SLU}$ for urging the pressing member 48, which presses the first friction plates 38 and the second friction plates 44, toward the front cover 34 is supplied to the control oil chamber 20d. A later-described second line oil pressure Psec for releasing the lockup clutch 32 is supplied to the front-side oil chamber 20e. That is, the second line oil pressure Psec for urging the pressing member 48 toward the other side of the front cover 34 is supplied to the front-side oil chamber 20e. The rear-side oil chamber 20g communicates with the front-side oil chamber 20e, is filled with hydraulic oil from the front-side oil chamber 20e, and causes the hydraulic oil to flow out from the hydraulic oil outflow port 20b. Incidentally, the control oil chamber 20d is an oil-tight space formed between the pressing member 48 and the fixed member 50. The front-side oil chamber 20e is a space formed between the pressing member 48 and the front cover 34. The rear-side oil chamber 20g is a space in the main oil chamber 20c that excludes the control oil chamber 20d and the front-side oil chamber 20e.

Besides, as shown in FIG. 3, in the torque converter 20, for example, an oil pressure that is supplied to the control oil chamber 20d, namely, a lockup-on pressure $P_{LupON}$ (kPa) becomes relatively high (an oil pressure of the front-side oil chamber 20e, namely, a torque converter-in pressure $P_{TCin}$ (kPa) becomes relatively low), so the pressing member 48 is urged and moved toward the front cover 34 as indicated by an alternate long and short dash line. Then, the pressing member 48 presses the first friction plates 38 and the second friction plates 44, and the pump impeller 20p and the turbine impeller 20t rotate integrally with each other. The pump impeller 20p is coupled to the first annular member 36. The turbine impeller 20t is coupled to the second annular member 42. Besides, for example, the lockup-on pressure $P_{LupON}$ (kPa) in the control oil chamber 20d becomes relatively low (the torque converter-in pressure $P_{TCin}$ (kPa) in the front-side oil chamber 20e becomes relatively high), so the pressing member 48 is moved to a position spaced apart from the first friction plates 38, as indicated by a solid line. Then, the pump impeller 20p and the turbine impeller 20t rotate relatively to each other.

The torque transmitted to the lockup clutch 32 is controlled based on a lockup differential pressure $\Delta P$ (=$P_{LupON}$−($P_{TCin}$+$P_{TCout}$)/2). The lockup differential pressure is a differential pressure between the lockup-on pressure $P_{LupON}$ (kPa) in the control oil chamber 20d and an average (($P_{TCin}$+$P_{TCout}$)/2) of the torque converter-in pressure $P_{TCin}$ (kPa) in the front-side oil chamber 20e and a torque converter-out pressure $P_{TCout}$ (kPa) that is output from the hydraulic oil outflow port 20b. Incidentally, the aforementioned expression of the lockup differential pressure (the engagement pressure) $\Delta P = P_{LupON} - (P_{TCin}+P_{TCout})/2$ is an experimental formula that is determined in advance through an experiment or the like. Besides, in the aforementioned expression, the torque converter-in pressure $P_{TCin}$ and the torque converter-out pressure $P_{TCout}$ change in accordance with an engine rotational speed Ne (rpm), a turbine rotational speed Nt (rpm), a differential rotation between the engine and the turbine (the engine rotational speed—the turbine rotational speed) ΔN (rpm), a second line oil pressure Psec (kPa), an ATF oil temperature Toil (° C.), an engine torque Te (Nm) and the like. Incidentally, the aforementioned torque converter-out pressure $P_{Tcout}$ changes through changes in centrifugal oil pressure in the rear-side oil chamber 20g of the torque converter 20 resulting from changes in the engine rotational speed Ne, the turbine rotational speed Nt, the ATF oil temperature Toil and the like.

The lockup differential pressure ΔP of the lockup clutch 32 is controlled via the oil pressure control circuit 54 by the electronic control unit 56. For example, the lockup clutch 32 is changed over to one of a lockup release state (lockup off), a lockup slip state (a slip state) and a lockup state (lockup on) by the electronic control unit 56. The lockup release state is a state where the lockup differential pressure ΔP is negative and the lockup clutch 32 is released. The lockup slip state is a state where the lockup differential pressure ΔP is equal to or higher than zero and the lockup clutch 32 is half-engaged while slipping. The lockup state is a state where the lockup differential pressure ΔP is maximized and the lockup clutch 32 is completely engaged. Incidentally, in the torque converter 20, the front-side oil chamber 20e and the rear-side oil chamber 20g continue to be the same chambers regardless of whether the lockup clutch 32 is in the lockup state, the lockup slip state or the lockup release state. That is, the front-side oil chamber 20e and the rear-side oil chamber 20g constantly communicate with each other, and the lockup clutch 32 is favorably cooled by hydraulic oil that is supplied from the hydraulic oil supply port 20a.

The automatic transmission 22 constitutes part of a power transmission path from the engine 12 to the driving wheels 14. Moreover, the automatic transmission 22 forms a plurality of gear stages (shift stages) that are different in gear ratio (speed ratio) from one another through selective engagement of a plurality of hydraulic frictional engagement devices (first to fourth clutches C1 to C4, a first brake B1 and a second brake B2) and a one-way clutch F1. Therefore, the automatic transmission 22 is a planetary gear-type multistage transmission that functions as a stepped automatic transmission. For example, the automatic transmission 22 is a stepped transmission that is often employed in a vehicle to carry out a so-called clutch-to-clutch shift. The automatic transmission 22 has a double pinion-type first planetary gear device 58, a single pinion-type second planetary gear device 60 that is configured as a Ravigneaux type, and a double pinion-type third planetary gear device 62 coaxially with one another (on the axial center RC). The automatic transmission 22 changes rotation of the transmission input shaft 30, and outputs the changed rotation from the transmission output gear 24.

The first planetary gear device 58 has a first sun gear S1 as an external gear, a first ring gear R1 as an internal gear that is arranged concentrically with the first sun gear S1, a first pinion gear P1 that meshes with the first sun gear S1 and the first ring gear R1 and that is constituted of a pair of gear pairs, and a first carrier CA1 that supports the first pinion gear P1 such that the first pinion gear P1 can rotate around its own axis and around the first carrier CA1.

The second planetary gear device 60 has a second sun gear S2 as an external gear, a second ring gear R2 as an internal gear that is arranged concentrically with the second sun gear S2, a second pinion gear P2 that meshes with the second sun gear S2 and the second ring gear R2, and a second carrier CA2 that supports the second pinion gear P2 such that the second pinion gear P2 can rotate around its own axis and around the second carrier CA2.

The third planetary gear device 62 has a third sun gear S3 as an external gear, a third ring gear R3 as an internal gear that is arranged concentrically with the third sun gear S3, a third pinion gear P3 that meshes with the third sun gear S3 and the third ring gear R3 and that is constituted of a pair of gear pairs, and a third carrier CA3 that supports the third pinion gear P3 such that the third pinion gear P3 can rotate around its own axis and around the third carrier CA3.

The aforementioned first clutch C1, the aforementioned second clutch C2, the aforementioned third clutch C3, the aforementioned fourth clutch C4, the aforementioned first brake B1 and the aforementioned second brake B2 (hereinafter referred to simply as frictional engagement devices or engagement elements when no distinction is made among them in particular) are configured as wet-type multi-plate clutches and a wet multi-plate brake that are pressed by hydraulic actuators, a band brake that is tightened by a hydraulic actuator, and the like. Incidentally, each of the hydraulic frictional engagement devices is engaged as soon as the engagement pressure becomes equal to a predetermined value.

As shown in an engagement chart of FIG. 4, respective gear stages, namely, eight forward stages and one backward stage are formed in accordance with a driver's operation of an accelerator, a vehicle speed V and the like, through the control of engagement and release of the hydraulic frictional engagement devices. In FIG. 4, "1st" to "8th" mean first to eighth shift stages as forward gear stages, and "Rev" means a backward shift stage as a backward gear stage. A gear ratio γ of the automatic transmission 22 corresponding to each of the shift stages (=a transmission input shaft rotational speed Nin/a transmission output gear rotational speed Nout) is appropriately determined by respective gear ratios (=the number of teeth of the sun gear/the number of teeth of the ring gear) of the first planetary gear device 58, the second planetary gear device 60 and the third planetary gear device 62.

Figure 5:
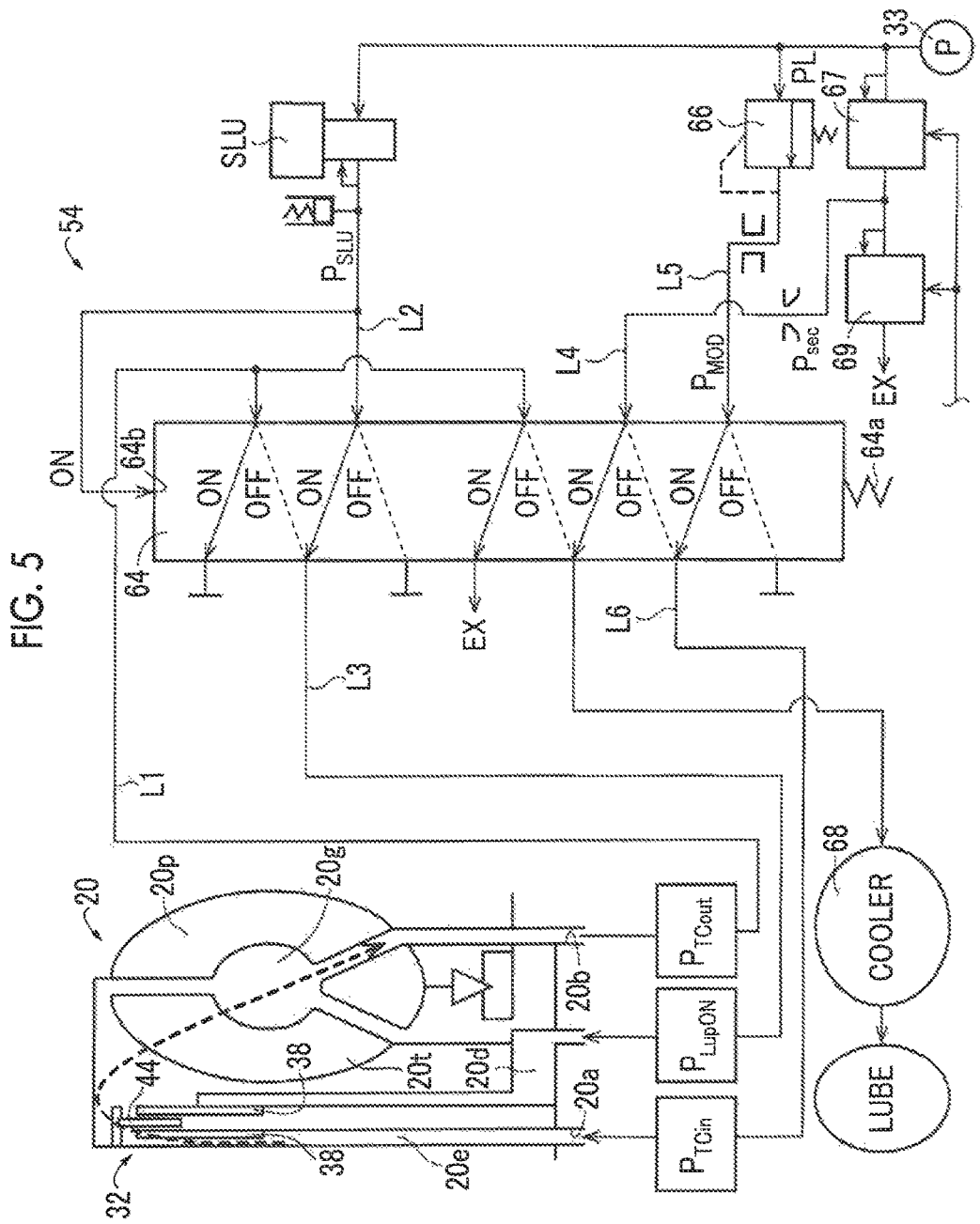
FIG. 5 is a circuit diagram showing an example of an essential part of an oil pressure control circuit regarding linear solenoid valves and the like that control the operation of a lockup clutch that is provided in the torque converter of FIG. 2.

As shown in FIG. 5, the oil pressure control circuit 54 is equipped with a lockup control valve 64, a linear solenoid valve SLU that adjusts a first line oil pressure PL, which is adjusted by a first relief-type line pressure adjusting valve 67 using an oil pressure generated from the oil pump 33 as a source pressure, to the lockup engagement pressure $P_{SLU}$, and a modulator valve 66 that adjusts a modulator oil pressure $P_{MOD}$ to a constant pressure using the first line oil pressure PL as a source pressure. The aforementioned oil pressure control circuit 54 is equipped with linear solenoid valves SL1 to SL6 (see FIG. 1) that control the operation of the respective hydraulic actuators (not shown) of the hydraulic frictional engagement devices. Incidentally, in FIG. 5, the first line oil pressure PL is used as a source pressure of the aforementioned linear solenoid valve SLU, but the modulator oil pressure $P_{MOD}$ may be used instead of the first line oil pressure PL.

Besides, as shown in FIG. 5, the lockup control valve 64 is a two-position changeover valve that is designed to be changed over from an OFF position to an ON position when the lockup engagement pressure $P_{SLU}$ becomes higher than a predetermined value. At the ON position, the lockup control valve 64 closes a first oil passage L1, connects a second oil passage L2 to a third oil passage L3, connects the first oil passage L1 to an exhaust oil passage EX, connects a fourth oil passage L4 to a cooler 68, and connects a fifth oil passage L5 to a sixth oil passage L6. The aforementioned first oil passage L1 is an oil passage into which a torque converter-out pressure $P_{TCout}$ output from the hydraulic oil outflow port 20b of the torque converter 20 is introduced. The aforementioned second oil passage L2 is an oil passage into which the lockup engagement pressure $P_{SLU}$ adjusted by the linear solenoid valve SLU is introduced. The aforementioned third oil passage L3 is an oil passage into which a lockup-on pressure $P_{LupON}$ that is supplied to the control oil chamber 20d of the torque converter 20 is introduced. The aforementioned fourth oil passage L4 is an oil passage into which a second line oil pressure Psec adjusted by a second line pressure adjusting valve 69 using an oil pressure relieved from the first line pressure adjusting valve 67 as a source pressure is introduced. The aforementioned fifth oil passage L5 is an oil passage into which the modulator oil pressure $P_{MOD}$ adjusted to a constant value by the modulator valve 66 is introduced. The aforementioned sixth oil passage L6 is an oil passage into which the torque converter-in pressure $P_{TCin}$ that is supplied to the front-side oil chamber 20e of the torque converter 20 is introduced.

Besides, as shown in FIG. 5, at the OFF position, the lockup control valve 64 connects the first oil passage L1 to the third oil passage L3, closes the second oil passage L2, connects the first oil passage L1 to the cooler 68, connects the fourth oil passage L4 to the sixth oil passage L6, and closes the fifth oil passage L5. The aforementioned lockup control valve 64 is equipped with a spring 64a that urges a spool valve piece toward the OFF position, and an oil chamber 64b that receives the lockup engagement pressure $P_{SLU}$ to urge the spool valve piece toward the ON position. In the lockup control valve 64, when the lockup engagement pressure $P_{SLU}$ is lower than a predetermined value set relatively low, the spool valve piece is held at the OFF position due to an urging force of the spring 64a. Besides, in the lockup control valve 64, when the lockup engagement pressure $P_{SLU}$ is higher than the predetermined value, the spool valve piece is held at the ON position against the urging force of the spring 64a. Incidentally, in the lockup control valve 64 of FIG. 5, a solid line indicates a flow passage at the time when the spool valve piece is at the ON position, and a broken line indicates a flow passage at the time when the spool valve piece is at the OFF position.

The oil pressure that is supplied to the control oil chamber 20d and the front-side oil chamber 20e of the torque converter 20 from the lockup control valve 64 is changed over by the oil pressure control circuit 54 configured as described above, so the operation state of the lockup clutch 32 is changed over. First of all, a case where the lockup clutch 32 is in the slip state or the lockup-on state will be described. In the lockup control valve 64, when the lockup engagement pressure $P_{SLU}$ made higher than the predetermined value through a command signal that is output from the electronic control unit 56 is supplied, the lockup control valve 64 is changed over to the ON position. Then, the lockup engagement pressure $P_{SLU}$ is supplied to the control oil chamber 20d of the torque converter 20, and the modulator oil pressure $P_{MOD}$ supplied to the lockup control valve 64 is supplied to the front-side oil chamber 20e of the torque converter 20. That is, the lockup engagement pressure $P_{SLU}$ is supplied to the control oil chamber 20d as the lockup-on pressure $P_{LupON}$, and the modulator oil pressure $P_{MOD}$ is supplied to the front-side oil chamber 20e as the torque converter-in pressure $P_{Tcin}$. Incidentally, when the lockup control valve 64 is changed over to the ON position, there is established a relationship in magnitude among the lockup-on pressure $P_{LupON}$, the torque converter-in pressure $P_{TCin}$ and the torque converter-out pressure $P_{TCout}$ as follows: the lockup-on pressure $P_{LupoN}$>the torque converter-in pressure $R_{TCin}$>the torque converter-out pressure $P_{TCout}$. Thus, the lockup-on pressure (the engagement pressure) $P_{LupoN}$ of the control oil chamber 20d of the torque converter 20 is adjusted by the linear solenoid valve SLU. Then, the lockup differential pressure $(P_{LupoN}-(P_{TCin}+P_{TCout})/2)\Delta P$ is adjusted, and the operation state of the lockup clutch 32 is changed over within a range of the slip state to the lockup-on state (complete engagement).

Next, a case where the lockup clutch 32 is in the lockup-off state will be described. In the lockup control valve 64, when the lockup engagement pressure $P_{SLU}$ is lower than the predetermined value, the lockup control valve 64 is changed over to the OFF position due to the urging force of the spring 64a. Then, the torque converter-out pressure $P_{TCout}$ output from the hydraulic oil outflow port 20b of the torque converter 20 is supplied to the control oil chamber 20d of the torque converter 20, and the second line oil pressure Psec is supplied to the front-side oil chamber 20e of the torque converter 20. That is, the torque converter-out pressure $P_{TCout}$ is supplied to the control oil chamber 20d as the lockup-on pressure $P_{LupON}$, and the second line oil pressure Psec is supplied to the front-side oil chamber 20e as the torque converter-in pressure $P_{Tcin}$. Incidentally, when the lockup control valve 64 is changed over to the OFF position, there is established a relationship in magnitude among the aforementioned lockup-on pressure $P_{LupON}$, the aforementioned torque converter-in pressure $P_{Tcin}$ and the aforementioned torque converter-out pressure $P_{TCout}$ as follows: the torque converter-in pressure $P_{TCin}$>the torque converter-out pressure $P_{TCout}$>the lockup-on pressure $P_{LupON}$. Thus, the operation state of the lockup clutch 32 is changed over to the lockup-off state.

Returning to FIG. 1, the vehicle 10 is equipped with the electronic control unit 56 that performs, for example, lockup control for controlling the lockup differential pressure AP of the lockup clutch 32, shift control for controlling the engagement pressure of the hydraulic frictional engagement devices in shifting the automatic transmission 22, and the like via the oil pressure control circuit 54. FIG. 1 is a view showing an input/output system of the electronic control unit 56, and is a functional block diagram illustrating an essential part of control functions performed by the electronic control unit 56. The electronic control unit 56 is configured to include, for example, a so-called microcomputer that is equipped with a CPU, a RAM, a ROM, an input/output interface and the like. Moreover, the CPU performs respective kinds of control of the vehicle 10 by carrying out a signal processing according to a program stored in advance in the ROM while utilizing a temporary storage function of the RAM.

Various input signals that are detected by various sensors with which the vehicle 10 is equipped are supplied to the electronic control unit 56. For example, a signal representing a throttle valve opening degree θth (%) as a detection result of a throttle valve opening degree sensor 70, a signal representing a vehicle speed V (km/h) as a detection result of a vehicle speed sensor 72, a signal representing an oil temperature T (° C.) of hydraulic oil as a detection result of an oil temperature sensor 74, a signal representing an operation amount Acc of an accelerator pedal as a detection result of an accelerator operation amount sensor 76, and the like are input to the electronic control unit 56. Besides, a shift command pressure (a command pressure) Sat for oil pressure control regarding the shifting of the automatic transmission 22, a lockup command pressure (a command pressure) Slu for changeover control of the operation state of the lockup clutch 32, and the like are output from the electronic control unit 56. Incidentally, the aforementioned shift command pressure Sat is a command signal for driving the linear solenoid valves SL1 to SL6 that adjust the respective oil pressures that are supplied to the respective hydraulic actuators (not shown) of the hydraulic frictional engagement devices. Then, the shift command pressure Sat is output to the linear solenoid valves SL1 to SL6 of the oil pressure control circuit 54. Besides, the aforementioned lockup command pressure Slu is a command signal for driving the linear solenoid valve SLU that adjusts the lockup engagement pressure $P_{SLU}$. Then, the lockup command pressure Slu is output to the linear solenoid valve SLU of the oil pressure control circuit 54.

The electronic control unit 56 shown in FIG. 1 includes a shift control unit 80, a lockup clutch control unit 82 and the like as an essential part of the control functions. The shift control unit 80 shown in FIG. 1 makes a determination on shifting by applying the actual vehicle speed V and the actual throttle valve opening degree θth to a relationship (a shift map or a shift diagram) determined in advance using the vehicle speed V and the throttle valve opening degree θth as variables. Moreover, the shift control unit 80 outputs, to the oil pressure control circuit 54, a shift command pressure Sat for engaging and/or releasing the hydraulic frictional engagement devices regarding the shifting of the automatic transmission 22, as a command signal, such that the predetermined forward gear stage determined in the determination on shifting is obtained, for example, according to the engagement operation chart shown in FIG. 4. In accordance with the shift command pressure Sat, the linear solenoid valves SL1 to SL6 that are provided in the oil pressure control circuit 54 are driven (operated) such that the shifting of the automatic transmission 22 is carried out, and the hydraulic actuators of the hydraulic frictional engagement devices regarding the shifting are operated.

As shown in FIG. 1, the lockup clutch control unit 82 is equipped with a first determination unit 82a, a second determination unit 82b, a third determination unit 82c, a first performance unit 82f having a fourth determination unit 82d and a command pressure detection unit 82e, and a second performance unit 82g. The lockup clutch control unit 82 performs lockup control for controlling the lockup differential pressure $\Delta P = (P_{LupON} - (P_{TCin} + P_{TCout})/2)$ of the lockup clutch 32. For example, the lockup clutch control unit 82 uses a relationship set in advance (a lockup region diagram) having a lockup-off region, a slip operation region and a lockup-on region, using the vehicle speed V and the throttle valve opening degree θth as variables. Then, the lockup clutch control unit 82 determines which one of the lockup-off region, the slip operation region and the lockup-on region is in use, based on the actual vehicle speed V and the actual throttle valve opening degree θth. Besides, the lockup clutch control unit 82 outputs the lockup command pressure Slu as a command signal to the oil pressure control circuit 54, such that the operation state of the lockup clutch 32 corresponds to the determined region. In accordance with the lockup command pressure Slu, the linear solenoid valve SLU that is provided in the oil pressure control circuit 54 is driven (operated) such that the operation state of the lockup clutch 32 corresponds to the determined region.

The first determination unit 82a determines whether or not lockup control is being performed by the lockup clutch control unit 82. That is, the first determination unit 82a determines whether the operation state of the lockup clutch 32 is the lockup state (lockup on) or a lockup slip state (the slip state) in the lockup clutch control unit 82. For example, the first determination unit 82a determines that lockup control is being performed when the actual vehicle speed V and the actual throttle valve opening degree θth are in the lockup-on region or the slip operation region in the lockup region diagram, and determines that lockup control is not being performed when the actual vehicle speed V and the actual throttle valve opening degree θth are in the lockup-off region in the lockup region diagram.

The second determination unit 82b determines whether or not a condition for ending lockup control has been fulfilled when lockup control is being performed by the lockup clutch control unit 82. For example, when the actual vehicle speed V and the actual throttle valve opening degree θth move from the lockup-on region or the slip operation region to the lockup-off region in the lockup region diagram, the second determination unit 82b determines that the condition for ending lockup control has been fulfilled.

The third determination unit 82c determines whether or not a condition for starting lockup clutch engagement control for raising the lockup command pressure Slu to engage the lockup clutch 32 has been fulfilled. For example, when the actual vehicle speed V and the actual throttle valve opening degree θth move from the lockup-off region to the lockup-on region in the lockup region diagram, the third determination unit 82c determines that the condition for starting lockup clutch engagement control has been fulfilled.

When the second determination unit 82b determines that the condition for ending lockup control has been fulfilled, the first performance unit 82f starts lockup control end control (lockup clutch release control) for lowering the lockup command pressure Slu to release the lockup clutch 32. When the first performance unit 82f starts lockup control end control, the lockup command pressure Slu is lowered toward zero at a constant sweep rate SW determined in advance as shown in, for example, FIGS. 7 to 9. The aforementioned sweep rate SW is indicated by an amount of fall in the lockup command pressure Slu per an elapsed time t (sec) since the start of lockup control end control. Incidentally, when the shift control unit 80 starts an upward shift during the performance of the lockup control end control, namely, during a transient period of releasing the lockup clutch 32, the first performance unit 82f sets the aforementioned sweep rate SW smaller than in the case where the shift control unit 80 does not start a shift during the performance of lockup control end control. Besides, when the shift control unit 80 starts a downward shift during the performance of the lockup control end control, the first performance unit 82f sets the aforementioned sweep rate SW larger than in the case where the shift control unit 80 does not start a shift during the performance of lockup control end control.

When the first performance unit 82f starts lockup control end control, the command pressure detection unit 82e detects the lockup command pressure Slu every time a sampling time determined in advance elapses.

When the first performance unit 82f starts lockup control end control, the fourth determination unit 82d determines whether or not the lockup control end control has been ended. For example, when the first performance unit 82f starts lockup control end control and the command pressure detection unit 82e detects that the lockup command pressure Slu is equal to zero, the fourth determination unit 82d determines that lockup control end control has been ended.

When the third determination unit 82c determines that the condition for starting lockup clutch engagement control has been fulfilled, the second performance unit 82g starts lockup engagement control in the sequence of fast fill control (initial oil pressure quick supply control), constant-pressure standby control and command pressure raising control. Incidentally, the aforementioned fast fill control is control for temporarily raising the lockup command pressure Slu of the linear solenoid valve SLU to a predetermined value D1 set in advance and quickly supplying hydraulic oil to the control oil chamber 20d of the torque converter 20 as shown in, for example, FIG. 9. Besides, the aforementioned constant-pressure standby control is control for lowering the lockup command pressure Slu, which has been raised to the predetermined value D1 through the aforementioned fast fill control, to a predetermined value D2 set in advance and causing the lockup command pressure Slu to stand by at the predetermined value D2 for a predetermined time set in advance as shown in, for example FIG. 9. Incidentally, the aforementioned fast fill control and the aforementioned constant-pressure standby control are performed to carry out packing for swiftly narrowing a pack clearance of the lockup clutch 32. The aforementioned pack clearance is, for example, a gap from a position where the pressing member 48 provided on the lockup clutch 32 is returned by the return spring 52 to a position where the pressing member 48 abuts on the first friction plates 38. Besides, the aforementioned command pressure raising control is control for raising the lockup command pressure Slu, which has been caused to stand by at the predetermined value D2 through the aforementioned constant-pressure standby control, in accordance with a required torque capacity that is needed to engage the lockup clutch as shown in, for example, FIGS. 8 and 9.

Besides, when the first performance unit 82f starts lockup control end control, the fourth determination unit 82d determines that lockup control end control has not been ended, and the third determination unit 82c determines that the condition for starting lockup clutch engagement control has been fulfilled, the second performance unit 82g starts lockup clutch engagement control from that one of the fast fill control, the constant-pressure standby control and the command pressure raising control which is latest in sequence among them, as the lockup command pressure Slu detected by the command pressure detection unit 82e rises. Accordingly, lockup engagement control is started from that one of the fast fill control, the constant-pressure standby control and the command pressure raising control which is latest in sequence among them, as the lockup command pressure Slu detected by the command pressure detection unit 82e rises when the third determination unit 82c determines that the condition for starting lockup clutch engagement control has been fulfilled. That is, when a transition to lockup clutch engagement control is made during lockup control end control, the lockup clutch engagement control is started from that one of the fast fill control, the constant-pressure standby control and the command pressure raising control which is latest in sequence among them, as the lockup command pressure Slu at a transition time point for making a transition to lockup clutch engagement control rises.

Figure 7:
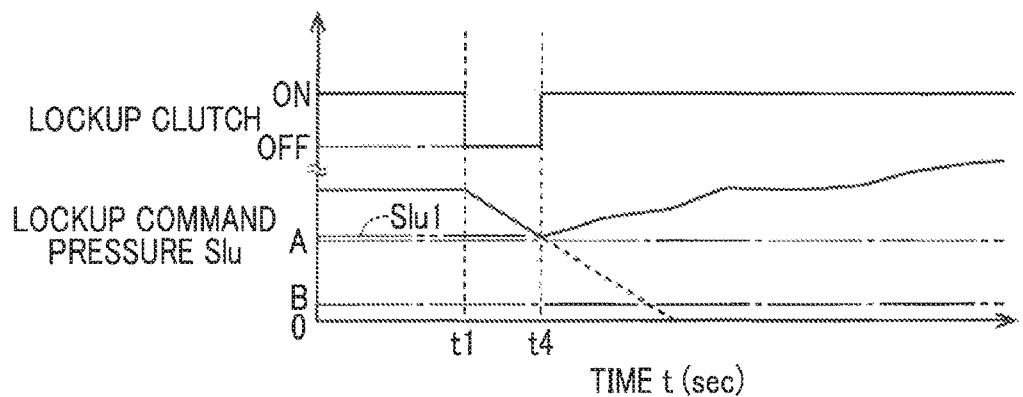
FIG. 7 is a time chart in the case where the control operation shown in the flowchart of FIG. 6 is carried out, and is a view showing a state where lockup clutch engagement control is started from command pressure raising control.

For example, when the lockup command pressure Slu detected by the command pressure detection unit 82e is equal to a value Slu1 that is equal to or higher than a value A corresponding to a first oil pressure $P_{PAC}$ that is needed to carry out packing for narrowing the pack clearance of the lockup clutch 32 as shown in FIG. 7, the second performance unit 82g starts the lockup clutch engagement control from the command pressure raising control. Incidentally, the aforementioned first oil pressure $P_{PAC}$ is an oil pressure that is needed to carry out packing for narrowing the pack clearance of the lockup clutch 32. For example, the aforementioned first oil pressure $P_{PAC}$ is expressed as a second oil pressure $P_{SP}+\alpha$ generated in the control oil chamber 20d such that the sum of a back pressure (the average $(P_{TCin}+P_{TCout})/2$ of the torque converter-in pressure and the torque converter-out pressure) and the pressing force of the pressing member 48 becomes equal to the urging force of the return spring 52. The aforementioned α is a value that changes in accordance with the state of the vehicle.

Besides, for example, when the lockup command pressure Slu detected by the command pressure detection unit 82e is equal to a value Slu3 that is equal to or lower than a value B at which the pressing force of the pressing member 48 that is generated through the lockup command pressure Slu is equal to the urging force of the return spring 52, the second performance unit 82g starts the lockup clutch engagement control from the fast fill control. Incidentally, in making the lockup clutch engagement control from the fast fill control, the second performance unit 82g performs the lockup control end control until the command pressure detection unit 82e determines that the lockup command pressure Slu is equal to zero. Then, when the command pressure detection unit 82e determines that the lockup command pressure Slu is equal to zero, the fast fill control is started.

Besides, for example, when the lockup command pressure Slu detected by the command pressure detection unit 82e is equal to the value Slu2 that is higher than the value B at which the pressing force of the pressing member 48 that is generated through the lockup command pressure Slu is equal to the urging force of the return spring 52 and that is lower than the value A corresponding to the first oil pressure $P_{PAC}$, the second performance unit 82g starts lockup clutch engagement control from the constant-pressure standby control.

Besides, when the first performance unit 82f starts lockup control end control, the fourth determination unit 82d determines that lockup control end control has not been ended, and the third determination unit 82c determines that the condition for starting lockup clutch engagement control has been fulfilled, the second performance unit 82g detects the oil temperature T (° C.) of hydraulic oil from the oil temperature sensor 74. Then, when the detected oil temperature T (° C.) of hydraulic oil is lower than a predetermined temperature T1 (° C.) set in advance, namely, when the oil temperature is low, the second performance unit 82g changes the aforementioned value A and the aforementioned value B such that the aforementioned value A and the aforementioned value B become lower than when the oil temperature is not low. That is, when the oil temperature is low, the responsiveness of the actual lockup engagement pressure $P_{SLU}$ in the control oil chamber 20d to the lockup command pressure Slu is slow. Therefore, even when the lockup command pressure Slu is low, the actual lockup engagement pressure $P_{SLU}$ is still high. For example, even in the case where the lockup command pressure Slu is slightly lower than the aforementioned value A at the time when the oil temperature is not low, it can be determined that the pack clearance has been narrowed. Therefore, the second performance unit 82g changes the aforementioned value A and the aforementioned value B such that the aforementioned value A and the aforementioned value B become lower by a value set in advance than when the oil temperature is not low.

Besides, when the first performance unit 82f starts lockup control end control, the fourth determination unit 82d determines that lockup control end control has not been ended, and the third determination unit 82c determines that the condition for starting lockup clutch engagement control has been fulfilled, the second performance unit 82g detects the presence or absence of an increase in the operation amount of the accelerator pedal (increased depression) from the accelerator operation amount sensor 76. Then, when there is an increase in the operation amount of the accelerator pedal, namely, when the driver intends to accelerate the vehicle, the second performance unit 82g changes the aforementioned value A and the aforementioned value B such that the aforementioned value A and the aforementioned value B become lower than when there is no increase in the operation amount of the accelerator pedal. That is, when the vehicle is accelerated, the driver's sensitivity to an engagement shock is relatively low. Even when some engagement shock occurs, the driver permits the occurrence thereof. Therefore, the second performance unit 82g changes the aforementioned value A and the aforementioned value B such that the aforementioned value A and the aforementioned value B become lower by a value set in advance than when the vehicle is not accelerated.

Besides, when the first performance unit 82f starts lockup control end control, the fourth determination unit 82d determines that lockup control end control has not been ended, and the third determination unit 82c determines that the condition for starting lockup clutch engagement control has been fulfilled, the second performance unit 82g determines whether or not the vehicle is being decelerated, from the vehicle speed sensor 72. Then, when the vehicle is decelerated, the second performance unit 82g changes the aforementioned value A and the aforementioned value B such that the aforementioned value A and the aforementioned value B become higher than when the vehicle is not decelerated. That is, when the vehicle is decelerated, the accelerator pedal is not operated, and the torque does not change either, so the driver's sensitivity to an engagement shock is relatively high. Therefore, the second performance unit 82g changes the aforementioned value A and the aforementioned value B such that the aforementioned value A and the aforementioned value B become higher by a value set in advance than when the vehicle is not decelerated.

Besides, when the first performance unit 82f starts lockup control end control, the fourth determination unit 82d determines that lockup control end control has not been ended, the third determination unit 82c determines that the condition for starting lockup clutch engagement control has been fulfilled, and the shift control unit 80 further determines that a downward shift is being carried out, the second performance unit 82g changes the aforementioned value A and the aforementioned value B such that the aforementioned value A and the aforementioned value B become lower by a value set in advance than when the shift is not being carried out. Besides, when the first performance unit 82f starts lockup control end control, the fourth determination unit 82d determines that lockup control end control has not been ended, the third determination unit 82c determines that the condition for starting lockup clutch engagement control has been fulfilled, and the shift control unit 80 further determines that an upward shift is being carried out, the second performance unit 82g changes the aforementioned value A and the aforementioned value B such that the aforementioned value A and the aforementioned value B become higher by a value set in advance than when the shift is not being carried out.

Figure 6:
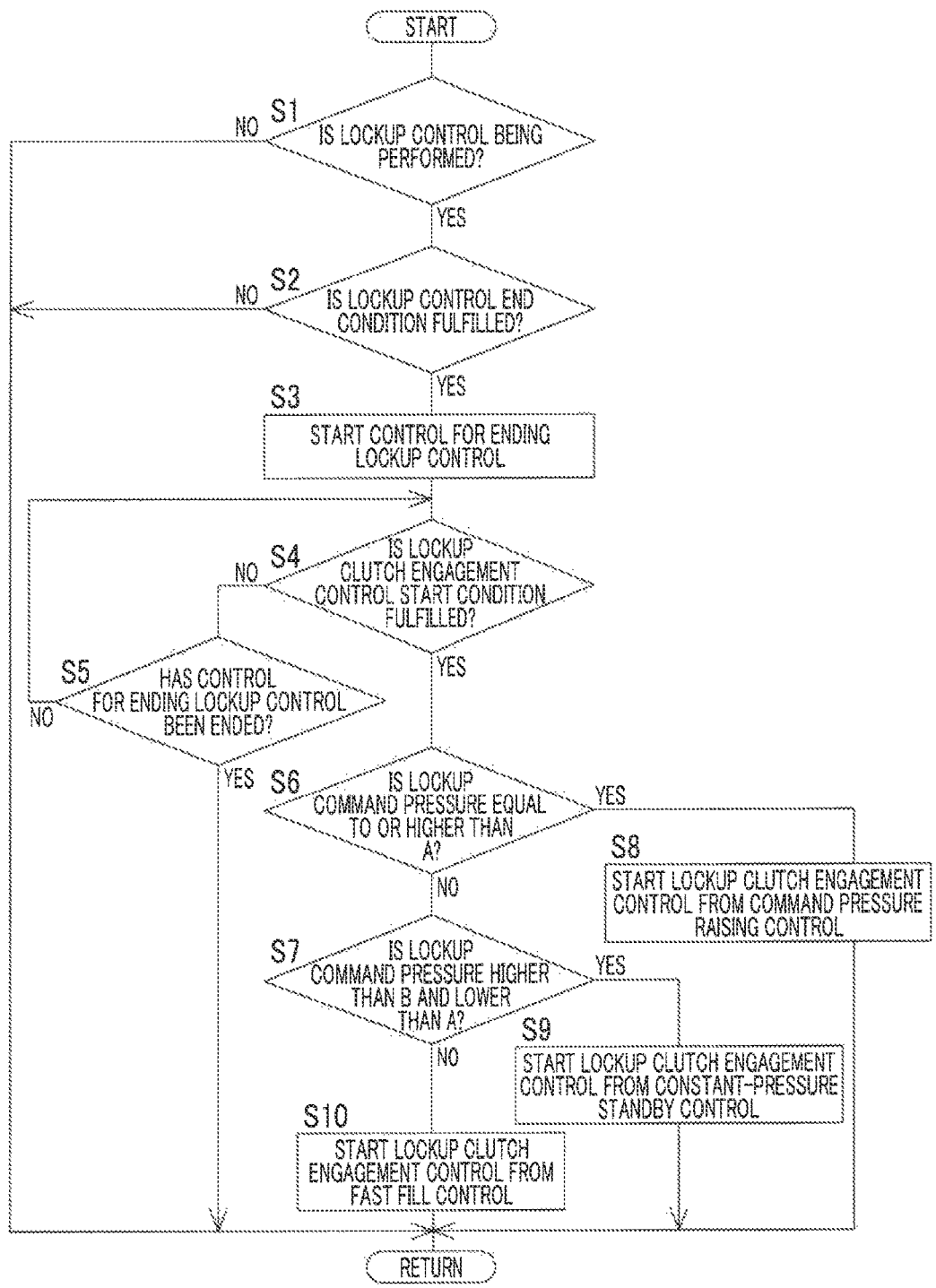
FIG. 6 is a flowchart illustrating an exemplary control operation of lockup clutch engagement control in making a transition to lockup clutch engagement control during lockup clutch release control, in an electronic control unit of FIG. 1.
Figure 8:
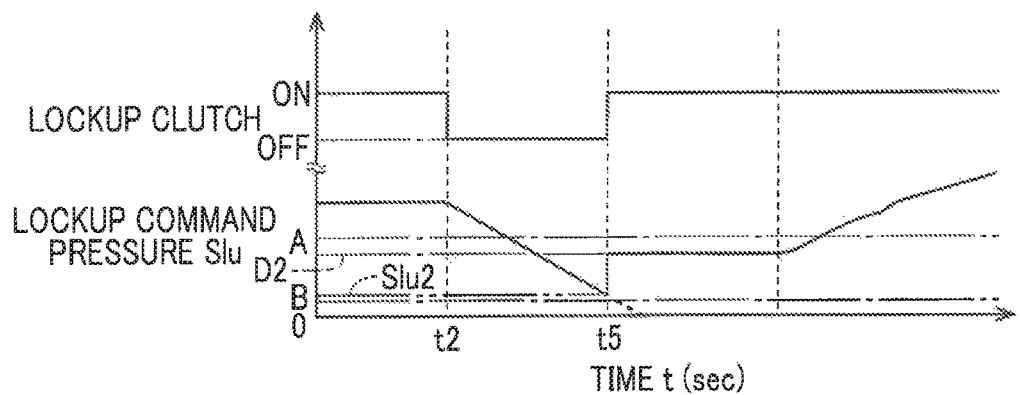
FIG. 8 is a time chart in the case where the control operation shown in the flowchart of FIG. 6 is carried out, and is a view showing a state where lockup clutch engagement control is started from constant-pressure standby control.
Figure 9:
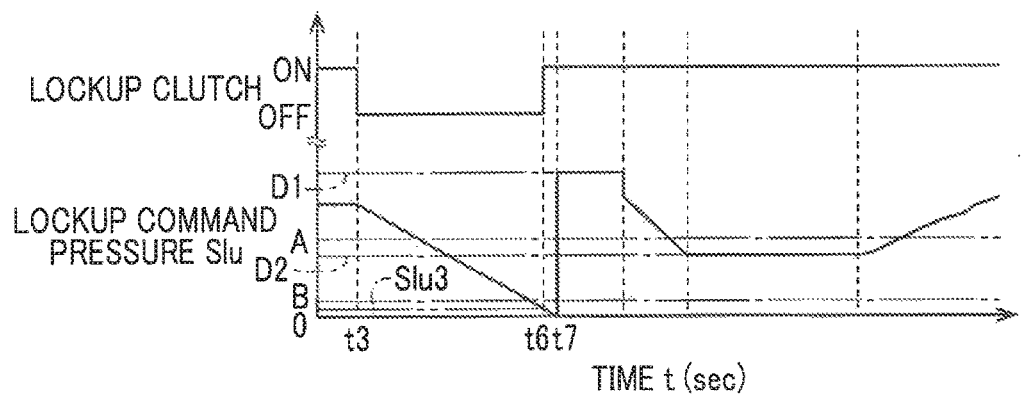
FIG. 9 is a time chart in the case where the control operation shown in the flowchart of FIG. 6 is carried out, and is a view showing a state where lockup clutch engagement control is started from fast fill control.

FIG. 6 is a flowchart illustrating an essential part of control operation of lockup clutch engagement control in making a transition to lockup clutch engagement control during lockup control end control (control for ending lockup control) in the electronic control unit 56. Besides, FIGS. 7 to 9 are time charts showing the control operation shown in the flowchart of FIG. 6.

First of all in step (the word "step" will be omitted hereinafter) S1 corresponding to the function of the first determination unit 82a, it is determined whether or not lockup control is being performed by the lockup clutch control unit 82. If the result of the determination in S1 is regarded as negative, S1 is carried out again. However, if the result of the determination in S1 is regarded as affirmative, S2 corresponding to the function of the second determination unit 82b is carried out. In the aforementioned S2, it is determined whether or not a condition for ending lockup control has been fulfilled. If the result of the determination in S2 is regarded as negative, the aforementioned S1 is carried out. However, if the result of the determination in S2 is regarded as affirmative (at a time point t1 in FIG. 7, at a time point t2 in FIG. 8, and at a time point t3 in FIG. 9), S3 corresponding to the function of the first performance unit 82f is carried out. In the aforementioned S3, lockup control end control (control for ending lockup control) is started, and the lockup command pressure Slu is lowered toward zero at the constant sweep rate SW set in advance.

Subsequently, S4 corresponding to the function of the third determination unit 82c is carried out. In the aforementioned S4, it is determined whether or not a condition for starting lockup clutch engagement control has been fulfilled. If the result of the determination in S4 is regarded as negative, S5 corresponding to the function of the fourth determination unit 82d is carried out. If the result of the determination in S4 is regarded as affirmative, S6 corresponding to the functions of the command pressure detection unit 82e and the second performance unit 82g is carried out. In the aforementioned S5, it is determined whether or not lockup control end control has been ended. If the result of the determination in S5 is regarded as negative, the aforementioned S4 is carried out. However, if the result of the determination in S5 is regarded as affirmative, the aforementioned S1 is carried out.

In the aforementioned S6, it is determined whether or not the lockup command pressure Slu at the time when it is determined that the condition for starting lockup clutch engagement control has been fulfilled is equal to or higher than the value A corresponding to the first oil pressure $P_{P4C}$ that is needed to carry out packing for narrowing the pack clearance of the lockup clutch 32. If the result of the determination in S6 is regarded as negative, S7 corresponding to the functions of the command pressure detection unit 82e and the second performance unit 82g is carried out. If the result of the determination in S6 is regarded as affirmative, namely, if the lockup command pressure Slu is equal to or higher than the aforementioned value A (at t4 in FIG. 7), S8 corresponding to the function of the second performance unit 82g is carried out. In the aforementioned S8, lockup clutch engagement control is started from command pressure raising control as shown in FIG. 7.

In the aforementioned S7, it is determined whether or not the lockup command pressure Slu at the time when it is determined that the condition for starting lockup clutch engagement control has been fulfilled is higher than the value B at which the pressing force of the pressing member 48 that is generated through the lockup command pressure Slu is equal to the urging force of the return spring 52 and lower than the value A corresponding to the first oil pressure $P_{P4C}$. If the result of the determination in S7 is regarded as affirmative, namely, if the lockup command pressure Slu is higher than the value B and lower than the value A (at a time point t5 in FIG. 8), S9 corresponding to the function of the second performance unit 82g is carried out. If the result of the determination in S7 is regarded as negative, namely, if the lockup command pressure Slu is equal to or lower than the value B (at a time point t6 in FIG. 9), S10 corresponding to the function of the second performance unit 82g is carried out.

In the aforementioned S9, lockup clutch engagement control is started from constant-pressure standby control as shown in FIG. 8. Besides, in the aforementioned S10, lockup control end control is performed until it is once determined that the lockup command pressure Slu is equal to zero. If it is determined that the lockup command pressure Slu is equal to zero (at a time point t7 in FIG. 9), lockup clutch engagement control is started from fast fill control.

According to the flowchart of FIG. 6, if the result of the determination in the aforementioned S6 is regarded as affirmative, namely, if the lockup command pressure Slu is equal to or higher than the value A in making a transition to lockup clutch engagement control during lockup control end control, the pack clearance of the lockup clutch 32 is narrow. Therefore, even when command pressure raising control is started to raise the lockup command pressure Slu, namely, to raise the lockup engagement pressure $P_{SLU}$, the pressing member 48 hardly moves toward the front cover 34. That is, when the pressing member 48 moves toward the front cover 34, for example, with the pack clearance not being narrow, the hydraulic oil between the pressing member 48 and the front cover 34 is compressed in the torque converter 20. Therefore, the torque converter-in pressure $P_{TCin}$ rises. That is, the torque converter-in pressure $P_{TCin}$ and the torque converter-out pressure $P_{TCout}$ rise to have a relatively great influence on the lockup engagement pressure $P_{SLU}$. However, with the pack clearance being narrow, the lockup engagement pressure $P_{SLU}$ is hardly influenced by the torque converter-in pressure $P_{TCin}$ and the torque converter-out pressure $P_{TCout}$, namely, is hardly influenced by the back pressure. Therefore, no engagement shock is caused even when lockup clutch engagement control is started from command pressure raising control.

Besides, according to the flowchart of FIG. 6, if the result of the determination in the aforementioned S7 is regarded as affirmative, namely, if the lockup command pressure Slu is higher than the value B and lower than the value A in making a transition to lockup clutch engagement control during lockup control end control, the pack clearance of the lockup clutch 32 may not be narrow. Therefore, when lockup clutch engagement control is started from command pressure raising control, the lockup engagement pressure $P_{SLU}$ is influenced by the aforementioned back pressure, so lockup clutch engagement control is started from constant-pressure standby control to reliably narrow the pack clearance. Besides, if the result of the determination in the aforementioned S7 is regarded as negative, namely, if the lockup command pressure Slu is equal to or lower than the value B, the pressing member 48 may not be able to move toward the front cover 34 with good responsiveness through a rise in the lockup command pressure Slu. Therefore, the start of lockup clutch engagement control is awaited until the lockup command pressure Slu once becomes equal to zero, and lockup clutch engagement control is started from fast fill control.

As described above, according to the electronic control unit 56 for the power transmission device 16 of the present embodiment of the disclosure, lockup clutch engagement control is performed in the sequence of fast fill control, constant-pressure standby control and command pressure raising control. Then, the electronic control unit 56 starts lockup clutch engagement control from that one of the fast fill control, the constant-pressure standby control and the command pressure raising control which is latest in sequence among them, as the lockup command pressure Slu for the lockup engagement pressure $P_{SLU}$ at a transition time point for making a transition to lockup clutch engagement control rises, in making the transition to lockup clutch engagement control during lockup control end control. Therefore, when the lockup command pressure Slu for the lockup engagement pressure $P_{SLU}$ at the transition time point for making the transition to lockup clutch engagement control is relatively high in making the transition to lockup clutch engagement control during lockup control end control, lockup clutch engagement control can be started from the command pressure raising control. Therefore, the running performance of the vehicle 10 is improved without causing an engagement shock, in comparison with a case where lockup clutch engagement control is started from fast fill control for uniformly narrowing the pack clearance of the lockup clutch 32.

Besides, according to the electronic control unit 56 for the power transmission device 16 of the present embodiment of the disclosure, when the lockup command pressure Slu for the lockup engagement pressure $P_{SLU}$ at the transition time point for making the transition to lockup clutch engagement control is equal to or higher than the value A corresponding to the first oil pressure $P_{PAC}$ that is needed to carry out packing for narrowing the pack clearance of the lockup clutch 32, lockup clutch engagement control is started from the command pressure raising control. Therefore, in lockup clutch engagement control to which a transition has been made during lockup control end control, a shock is favorably restrained from occurring in engaging the lockup clutch 32.

Besides, according to the electronic control unit 56 for the power transmission device 16 of the present embodiment of the disclosure, the lockup clutch 32 is equipped with the pressing member 48 that presses the first friction plates 38 and the second friction plates 44 through the supply of the lockup engagement pressure $P_{SLU}$ to the control oil chamber 20d, and the return spring 52 that urges the pressing member 48 in such a direction as to move away from the first friction plates 38 and the second friction plates 44. Moreover, when the lockup command pressure Slu for the lockup engagement pressure $P_{SLU}$ at the transition time point for making the transition to lockup clutch engagement control is equal to or lower than the value B at which the pressing force of the pressing member 48 that is generated through the lockup command pressure Slu is equal to the urging force of the return spring 52, lockup clutch engagement control is started from fast fill control. Therefore, in lockup clutch engagement control to which a transition has been made during lockup control end control, when the lockup command pressure Slu for the lockup engagement pressure $P_{SLU}$ at the transition time point for making the transition to lockup clutch engagement control is equal to or lower than the value B at which the pressing force of the pressing member 48 that is generated through the lockup command pressure Slu is equal to the urging force of the return spring 52, lockup clutch engagement control is started from the fast fill control to carry out packing for narrowing the pack clearance of the lockup clutch 32. Therefore, a shock is favorably restrained from occurring in engaging the lockup clutch 32.

Besides, according to the electronic control unit 56 for the power transmission device 16 of the present embodiment of the disclosure, when lockup clutch engagement control is performed from fast fill control, lockup control end control is performed until the lockup command pressure Slu for the lockup engagement pressure $P_{SLU}$ once becomes equal to zero. After that, the electronic control unit 56 starts the fast fill control. Therefore, the lockup engagement pressure $P_{SLU}$ in the control oil chamber 20d is favorably drained when the fast fill control is started. Therefore, the actual oil pressure in the control oil chamber 20d is restrained from becoming higher than a target value when the fast fill control is performed.

Besides, according to the electronic control unit 56 for the power transmission device 16 of the present embodiment of the disclosure, when the lockup command pressure Slu for the lockup engagement pressure $P_{SLU}$ at the transition time point for making the transition to lockup clutch engagement control is higher than the value B at which the pressing force of the pressing member 48 that is generated through the lockup command pressure Slu is equal to the urging force of the return spring 52 and lower than the value A corresponding to the first oil pressure $P_{PAC}$, lockup clutch engagement control is started from the constant-pressure standby control. Therefore, in lockup clutch engagement control to which a transition has been made during lockup control end control, when the lockup command pressure Slu for the lockup engagement pressure $P_{SLU}$ at the transition time point for making the transition to lockup clutch engagement control is higher than the value B at which the pressing force of the pressing member 48 that is generated through the lockup command pressure Slu is equal to the urging force of the return spring 52 and lower than the value A corresponding to the first oil pressure $P_{PAC}$, lockup clutch engagement control is started from the constant-pressure standby control to carry out packing for narrowing the pack clearance of the lockup clutch 32. Therefore, a shock is favorably restrained from occurring in engaging the lockup clutch 32.

Next, the other embodiment of the disclosure will be described. Incidentally, components common to those of the foregoing first embodiment of the disclosure will be denoted by the same reference symbols respectively, and description thereof will be omitted.

Figure 10:
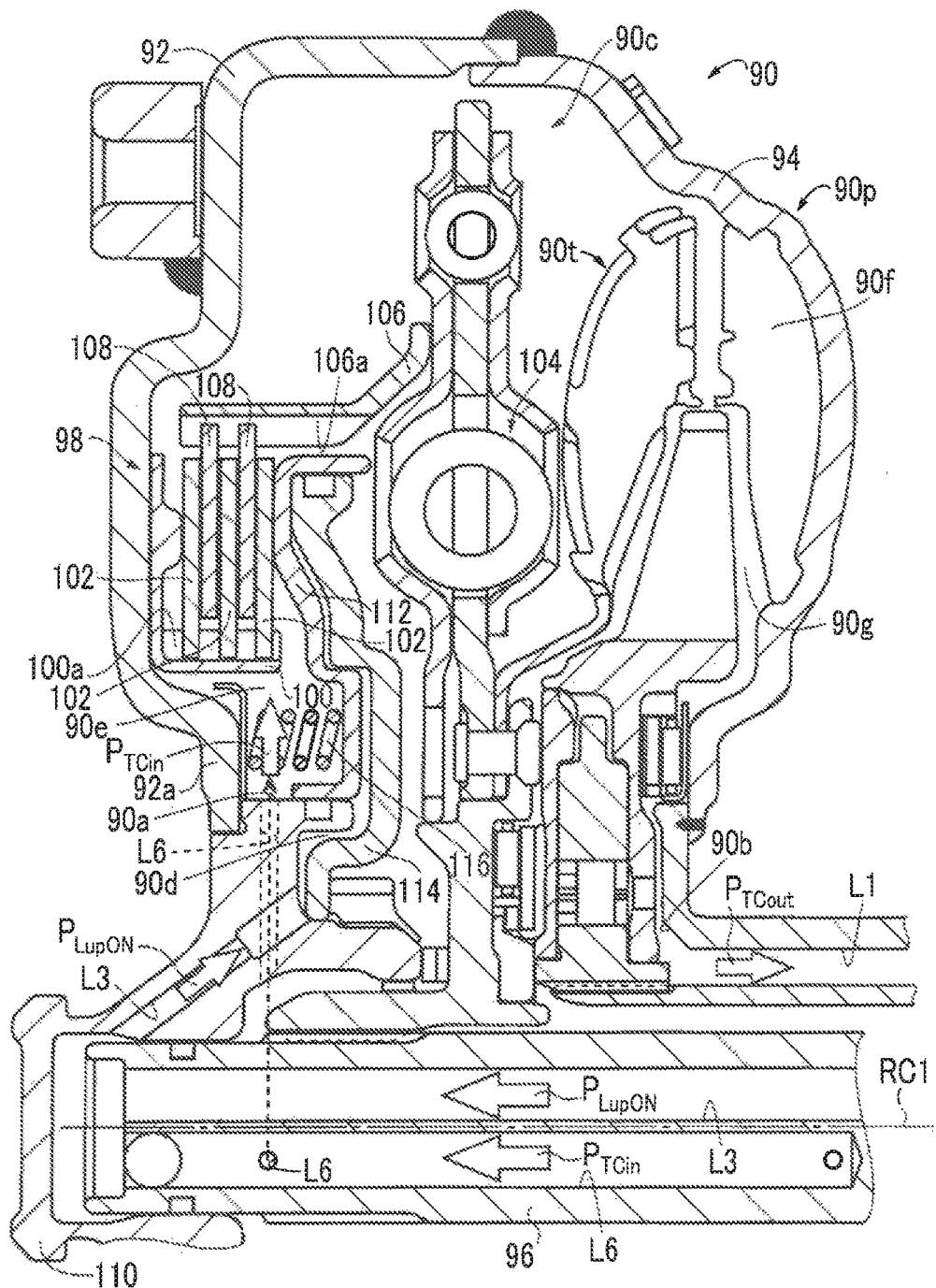
FIG. 10 is a cross-sectional view showing a torque converter according to the other embodiment of the disclosure.

FIG. 10 is a view illustrating a power transmission device (a vehicular power transmission device) according to the other embodiment of the disclosure. The power transmission device according to the present embodiment of the disclosure is different from the power transmission device 16 according to the first embodiment of the disclosure in that a torque converter (a fluid coupling) 90 is different in shape from the torque converter 20. The power transmission device according to the present embodiment of the disclosure is substantially the same as the power transmission device 16 according to the first embodiment of the disclosure in the other respects.

The torque converter 90 has a front cover 92 and a rear cover 94 that are welded to each other, and a plurality of pump blades 90f that are fixed to an inner side of the rear cover 94. Furthermore, the torque converter 90 is equipped with a pump impeller (an input member) 90p and a turbine impeller (an output member) 90t. The pump impeller 90p is coupled to the crankshaft 12a of the engine 12 in such a manner as to enable power transmission, and is disposed in such a manner as to rotate around the axial center RC. The turbine impeller 90t is opposed to the rear cover 94, and is coupled to a transmission input shaft 96 in such a manner as to enable power transmission. The torque converter 90 is equipped with a lockup clutch 98 that directly couples the pump impeller 90p and the turbine impeller 90t to each other through the supply of the lockup engagement pressure $P_{SLU}$ into a control oil chamber 90d that will be described later. As described hitherto, the torque converter 90 functions as a vehicular fluid coupling equipped with the lockup clutch 98, which is provided in a power transmission path between the engine 12 and the automatic transmission 22.

The lockup clutch 98 is a hydraulic multi-plate frictional clutch. As shown in FIG. 10, the lockup clutch 98 is equipped with a first annular member 100, a plurality of (three in the present embodiment of the disclosure) first annular friction plates (friction plates) 102, a second annular member 106, a plurality of (two in the present embodiment of the disclosure) second annular friction plates (friction plates) 108, an annular pressing member (a piston) 112, an annular fixed member 114 and a return spring 116. The first annular member 100 is fixed through welding to the front cover 92 that is integrally coupled to the pump impeller 90p. The plurality of the first annular friction plates 102 are engaged with outer peripheral spline teeth 100a formed on an outer periphery of the first annular member 100, relatively unrotatably around the axial center RC and movably in the direction of the axial center RC. The second annular member 106 is coupled to the transmission input shaft 96 and the turbine impeller 90t in such a manner as to enable power transmission, via a damper device 104 that is provided in the torque converter 90. The plurality of the second annular friction plates 108 are engaged with inner peripheral spline teeth 106a formed on an inner periphery of the second annular member 106 relatively unrotatably around the axial center RC and movably in the direction of the axial center RC, and are disposed among the plurality of the first friction plates 102 respectively. The annular pressing member 112 is supported by a hub member 110 movably in the direction of the axial center RC, and is opposed to the front cover 92. The hub member 110 is fixed to an inner peripheral portion 92a of the front cover 92, and is supported in such a manner as to be able to rotate an end portion of the transmission input shaft 96 on the front cover 92 side around the axial center RC. The annular fixed member 114 is supported by the hub member 110 at a fixed position, and is disposed in such a manner as to be opposed to the pressing member 112 on the other side of the front cover 92. The return spring 116 urges the pressing member 112 toward the fixed member 114 in the direction of the axial center RC. That is, the return spring 116 urges the pressing member 112 in such a manner as to move away from the first friction plates 102 and the second friction plates 108 in the direction of the axial center RC.

Furthermore, as shown in FIG. 10, the torque converter 90 is provided with a main oil chamber (a torque converter oil chamber) 90c in the front cover 92 and the rear cover 94. The main oil chamber 90c has a hydraulic oil supply port 90a to which hydraulic oil output from the oil pump 33 is supplied, and a hydraulic oil outflow port 90b from which hydraulic oil supplied from the hydraulic oil supply port 90a is caused to flow out. Besides, the lockup clutch 98, the control oil chamber 90d, a front-side oil chamber 90e and a rear-side oil chamber 90g are provided in the main oil chamber 90c of the torque converter 90. The lockup engagement pressure $P_{SLU}$ for engaging the lockup clutch 98 is supplied to the control oil chamber 90d. That is, the lockup engagement pressure $P_{SLU}$ for urging the pressing member 112, which presses the friction plates 102 and the second friction plates 108 of the lockup clutch 98, toward the front cover 92 is supplied to the control oil chamber 90d. The later-described second line oil pressure Psec for releasing the lockup clutch 98 is supplied to the front-side oil chamber 90e. That is, the second line oil pressure Psec for urging the pressing member 112 toward the other side of the front cover 92 is supplied to the front-side oil chamber 90e. The rear-side oil chamber 90g communicates with the front-side oil chamber 90e, is filled with hydraulic oil from the front-side oil chamber 90e, and causes the hydraulic oil to flow out from the hydraulic oil outflow port 90b.

In the torque converter 90, for example, when the lockup-on pressure $P_{LupON}$ (kPa) in the control oil chamber 90d is relatively high (the torque converter-in pressure $P_{TCin}$ (kPa) of the front-side oil chamber 90e is relatively low) and the pressing member 112 is moved toward the front cover 92 in the direction of an axial center RC1, the first friction plates 102 clamp the second friction plates 108 respectively through the pressing member 112, and the pump impeller 90p and the turbine impeller 90t rotate integrally with each other. The pump impeller 90p is coupled to the first annular member 100. The turbine impeller 90t is coupled to the second annular member 106. Besides, when the lockup-on pressure $P_{LupON}$ (kPa) in the control oil chamber 90d is relatively low (the torque converter-in pressure $P_{TCin}$ (kPa) in the front-side oil chamber 90e is relatively high) and the pressing member 112 is moved toward the other side of the front cover 92 in the direction of the axial center RC1, the pump impeller 90p and the turbine impeller 90t rotate relatively to each other.

The lockup clutch 98 is a hydraulic multi-plate friction clutch in which the plurality of the first friction plates 102 and the plurality of the second friction plates 108 are frictionally engaged with each other respectively through the control of the lockup differential pressure $\Delta P$ ($=P_{LupON}-(P_{TCin}+P_{TCout})/2$) by the foregoing oil pressure control circuit 54. The lockup differential pressure is a differential pressure between the lockup-on pressure $P_{LupoN}$ (kPa) in the control oil chamber 90d and the average (($P_{TCin}+P_{TCout})/2$) of the torque converter-in pressure $P_{TCin}$ (kPa) in the front-side oil chamber 90e and the torque converter-out pressure $P_{TCout}$ (kPa) that is discharged from the rear-side oil chamber 90g. Besides, the lockup differential pressure $\Delta P$ of the lockup clutch 98 is controlled via the oil pressure control circuit 54 by the electronic control unit 56. For example, the lockup clutch 98 is changed over to one of the lockup release state (lockup off), the lockup slip state (the slip state) and the lockup state (lockup on) by the electronic control unit 56. The lockup release state is a state where the lockup differential pressure $\Delta P$ is negative and the lockup clutch 98 is released. The lockup slip state is a state where the lockup differential pressure $\Delta P$ is equal to or higher than zero and the lockup clutch 98 is half-engaged while slipping. The lockup state is a state where the lockup differential pressure $\Delta P$ is maximized and the lockup clutch 98 is completely engaged.

Although the embodiments of the disclosure have been described above in detail based on the drawings, the disclosure is also applicable to other aspects thereof.

For example, the torque converter 20 or 90 according to each of the foregoing embodiments of the disclosure has the hydraulic oil supply port 20a or 90a, the hydraulic oil outflow port 20b or 90b, and the port that supplies the lockup engagement pressure $P_{SLU}$ to the control oil chamber 20d or 90d. Moreover, the torque converter 20 or 90 is structured such that the back pressure (($P_{TCin}+P_{TCout})/2$) rises as a result of compression of the hydraulic oil between the pressing member 48 or 112 and the front cover 34 or 92 due to the movement of the pressing member 48 or 112 when the lockup clutch is engaged. However, the disclosure is also applicable to other types of the torque converters 20 and 90. For example, in the case of a torque converter that is structured such that the aforementioned back pressure (($P_{TCin}+P_{TCout})/2$) is not applied thereto, the value A and the value B in each of the foregoing embodiments of the disclosure are equal to each other. Therefore, the lockup clutch engagement control may be started from command pressure raising control when the lockup command pressure is equal to or higher than the values A and B. The lockup clutch engagement control may be started from fast fill control when the lockup command pressure is lower than the values A and B.

Besides, in the foregoing embodiment of the disclosure, the torque converter 20 is employed in the vehicle 10. However, a fluid coupling that does not have a torque amplification effect or the like may be employed instead of the torque converter 20.

Incidentally, the foregoing is nothing more than the embodiments of the disclosure, and the disclosure can be carried out in various aspects thereof that are subjected to various alterations and improvements based on the knowledge of those skilled in the art.

What is claimed is:

1. A vehicle comprising:
   a transmission;
   a fluid coupling provided between the transmission and a power source;
   a lockup clutch configured to directly couple an input member and an output member of the fluid coupling by supply of a control oil pressure to a control oil chamber in the fluid coupling; and
   an electronic control unit configured to perform lockup clutch release control for lowering a command pressure for the control oil pressure to release the lockup clutch,
   the electronic control unit being configured to perform lockup clutch engagement control for raising the command pressure for the control oil pressure to engage the lockup clutch,
   the electronic control unit being configured such that the lockup clutch engagement control is performed in sequence of fast fill control, constant-pressure standby control and command pressure raising control, and
   the electronic control unit being configured to start the lockup clutch engagement control from one of the fast fill control and the command pressure raising control which is later in sequence than the other, as a first command pressure rises, in making a transition to the lockup clutch engagement control during the lockup clutch release control, the first command pressure being the command pressure for the control oil pressure at a transition time point for making the transition to the lockup clutch engagement control.

2. The vehicle according to claim 1, wherein
   the fast fill control is control for raising the command pressure for the control oil pressure to a first predetermined value set in advance and supplying the control oil pressure to the control oil chamber,
   the constant-pressure standby control is control for making the command pressure for the control oil pressure equal to a second predetermined value set in advance and causing the command pressure for the control oil pressure to stand by for a predetermined time, the second predetermined value is lower than the first predetermined value, and
   the command pressure raising control is control for raising the command pressure for the control oil pressure in accordance with a torque capacity that is needed to engage the lockup clutch.

3. The vehicle according to claim 1, wherein
   the electronic control unit is configured to start the lockup clutch engagement control from the command pressure raising control when the first command pressure is equal to or higher than a third predetermined value that is needed to carry out packing for narrowing a pack clearance of the lockup clutch.

4. The vehicle according to claim 3, wherein
the lockup clutch includes
a friction plate,
a piston configured to press the friction plate by supply of the control oil pressure to the control oil chamber,
a return spring configured to urge the piston in such a direction as to move away from the friction plate, and
the electronic control unit is configured to start the lockup clutch engagement control from the fast fill control when the first command pressure is equal to or lower than a value of a pressing force of the piston, the pressing force of the piston is generated by the command pressure and the value of the pressing force of the piston is equal to a value of an urging force of the return spring.

5. The vehicle according to claim 4, wherein
the electronic control unit is configured to perform the lockup clutch release control until the command pressure for the control oil pressure once becomes equal to zero and then to start the fast fill control, in performing the lockup clutch engagement control from the fast fill control.

6. The vehicle according to claim 4, wherein
the electronic control unit is configured to start the lockup clutch engagement control from the constant-pressure standby control when the first command pressure is higher than the value of the pressing force of the piston and lower than a value corresponding to the third predetermined value.

7. A control apparatus for a vehicle, the vehicle including
a transmission;
a fluid coupling provided between the transmission and a power source; and
a lockup clutch configured to directly couple an input member and an output member of the fluid coupling by supply of a control oil pressure to a control oil chamber in the fluid coupling,
the control apparatus comprising
an electronic control unit configured to:
perform lockup clutch release control for lowering a command pressure for the control oil pressure to release the lockup clutch,
perform lockup clutch engagement control for raising the command pressure for the control oil pressure to engage the lockup clutch,
perform the lockup clutch engagement control in sequence of fast fill control, constant-pressure standby control and command pressure raising control; and
start the lockup clutch engagement control from one of the fast fill control and the command pressure raising control which is later in sequence than the other, as a first command pressure rises, in making a transition to the lockup clutch engagement control during the lockup clutch release control the first command pressure being the command pressure for the control oil pressure at a transition time point for making the transition to the lockup clutch engagement control.

8. The control apparatus for the vehicle according to claim 7, wherein
the fast fill control is control for raising the command pressure for the control oil pressure to a first predetermined value set in advance and supplying the control oil pressure to the control oil chamber,
the constant-pressure standby control is control for making the command pressure for the control oil pressure equal to a second predetermined value set in advance and causing the command pressure for the control oil pressure to stand by for a predetermined time, the second predetermined value is lower than the first predetermined value, and
the command pressure raising control is control for raising the command pressure for the control oil pressure in accordance with a torque capacity that is needed to engage the lockup clutch.

9. The control apparatus for the vehicle according to claim 7, wherein
the electronic control unit is configured to start the lockup clutch engagement control from the command pressure raising control when the first command pressure is equal to or higher than a third predetermined value that is needed to carry out packing for narrowing a pack clearance of the lockup clutch.

10. The control apparatus for the vehicle according to claim 9, wherein
the electronic control unit is configured to perform the lockup clutch release control until the command pressure for the control oil pressure once becomes equal to zero and then to start the fast fill control, in performing the lockup clutch engagement control from the fast fill control.

11. A control method for a vehicle, the vehicle including
a transmission,
a fluid coupling that is provided between the transmission and a power source; and
a lockup clutch that is configured to directly couple an input member and an output member of the fluid coupling by supply of a control oil pressure to a control oil chamber in the fluid coupling, and
an electronic control unit,
the control method comprising:
performing, by the electronic control unit, lockup clutch release control for lowering a command pressure for the control oil pressure to release the lockup clutch, by the electronic control unit;
performing, by the electronic control unit, lockup clutch engagement control for raising the command pressure for the control oil pressure to engage the lockup clutch, by the electronic control unit, the lockup clutch engagement control being performed in sequence of fast fill control, constant-pressure standby control and command pressure raising control; and
starting, by the electronic control unit, the lockup clutch engagement control from one of the fast fill control and the command pressure raising control which is later in sequence than the other, as a first command pressure rises, in making a transition to the lockup clutch engagement control during the lockup clutch release control, the first command pressure being the command pressure for the control oil pressure at a transition time point for making the transition to the lockup clutch engagement control.

12. The control method for the vehicle according to claim 11, wherein
the fast fill control is control for raising the command pressure for the control oil pressure to a first predetermined value set in advance and supplying the control oil pressure to the control oil chamber,
the constant-pressure standby control is control for making the command pressure for the control oil pressure equal to a second predetermined value set in advance and causing the command pressure for the control oil pressure to stand by for a predetermined time, the second predetermined value is lower than the first predetermined value, and the command pressure raising control is control for raising the command pressure of the control oil pressure in accordance with a torque capacity that is needed to engage the lockup clutch.

13. The control method for the vehicle according to claim 11, wherein the lockup clutch engagement control is started from the command pressure raising control by the electronic control unit when the first command pressure is equal to or higher than a third predetermined value that is needed to carry out packing for narrowing a pack clearance of the lockup clutch.

14. The control method for the vehicle according to claim 11, wherein the lockup clutch release control is performed by the electronic control unit until the command pressure for the control oil pressure once becomes equal to zero, and then the fast fill control is started by the electronic control unit, in performing the lockup clutch engagement control from the fast fill control.

15. A vehicle comprising:

a transmission;

a fluid coupling that is provided between the transmission and a power source;

a lockup clutch that is configured to directly couple an input member and an output member of the fluid coupling by supply of a control oil pressure to a control oil chamber in the fluid coupling; and an electronic control unit configured to perform lockup clutch release control for lowering a command pressure for the control oil pressure to release the lockup clutch, the electronic control unit being configured to perform lockup clutch engagement control for raising the command pressure for the control oil pressure to engage the lockup clutch, the electronic control unit being configured such that the lockup clutch engagement control is performed in sequence of fast fill control, constant-pressure standby control and command pressure raising control, and the electronic control unit being configured to start the lockup clutch engagement control from the command pressure raising control when a first command pressure is equal to or higher than a third predetermined value, start the lockup clutch engagement control from the constant-pressure standby control when the first command pressure is lower than the third predetermined value and equal to or higher than a fourth predetermined value, and start the lockup clutch engagement control from the fast fill control when the first command pressure is lower than the fourth predetermined value, in making a transition to the lockup clutch engagement control during the lockup clutch release control, the first command pressure being the command pressure for the control oil pressure at a transition time point for making the transition to the lockup clutch engagement control.

16. The vehicle according to claim 15, wherein the third predetermined value is a value that is needed to carry out packing for narrowing a pack clearance of the lockup clutch, and the fourth predetermined value is a value of a pressing force of a piston, the pressing force of the piston is generated by the command pressure, the value of the pressing force of the piston is equal to a value of an urging force of a return spring.

* * * * *